(12) United States Patent
Margolin

(10) Patent No.: US 8,643,534 B2
(45) Date of Patent: Feb. 4, 2014

(54) SYSTEM FOR SENSING AIRCRAFT AND OTHER OBJECTS

(76) Inventor: Jed Margolin, VC Highlands, NV (US)

( * ) Notice: Subject to any disclaimer, the term of this patent is extended or adjusted under 35 U.S.C. 154(b) by 0 days.

(21) Appl. No.: 13/594,815

(22) Filed: Aug. 25, 2012

(65) Prior Publication Data
US 2013/0176163 A1   Jul. 11, 2013

Related U.S. Application Data

(62) Division of application No. 12/910,779, filed on Oct. 22, 2010, now Pat. No. 8,373,591.

(60) Provisional application No. 61/256,765, filed on Oct. 30, 2009.

(51) Int. Cl.
G01S 13/93    (2006.01)
G01S 13/75    (2006.01)

(52) U.S. Cl.
USPC ............................................ 342/30; 342/146

(58) Field of Classification Search
USPC .................................................... 342/27–40
See application file for complete search history.

(56) References Cited

U.S. PATENT DOCUMENTS

| | | |
|---|---|---|
| 3,515,805 A | 6/1970 | Fracassi et al. |
| 3,986,168 A | 10/1976 | Anderson |
| 4,195,293 A | 3/1980 | Margolin |
| 4,782,450 A | 11/1988 | Flax |
| 5,036,330 A | 7/1991 | Imae et al. |
| 5,153,836 A | 10/1992 | Fraughton et al. |
| 5,187,485 A | 2/1993 | Tsui et al. |
| 5,724,041 A | 3/1998 | Inoue et al. |
| 5,955,993 A | 9/1999 | Houghton et al. |
| 6,031,485 A | 2/2000 | Cellai et al. |
| 6,377,436 B1 | 4/2002 | Margolin |
| 7,414,567 B2 | 8/2008 | Zhang et al. |
| 7,737,878 B2 | 6/2010 | van Tooren et al. |
| 2011/0140950 A1 * | 6/2011 | Andersson ...................... 342/32 |

FOREIGN PATENT DOCUMENTS

EP       2136222 A1 * 12/2009 .............. G01S 13/76

OTHER PUBLICATIONS

14 CFR § 91.113(b) Right-of-way rules: Except water operations, Oct. 1, 2009.
14 CFR § 91.115(a) Right-of-way rules: Water operations, Oct. 1, 2009.
Introduction to TCAS II Version 7, United States Department of Transportation, Federal Aviation Administration Nov. 2000, p. 11.

(Continued)

*Primary Examiner* — Matthew M Barker

(57) ABSTRACT

A system for sensing aircraft and other objects uses bistatic radar with spread-spectrum signals transmitted from remotely located sources such as aircraft flying at very high altitudes or from a satellite constellation. A bistatic spread spectrum radar system using a satellite constellation can be integrated with a communications system and/or with a system using long baseline radar interferometry to validate the digital terrain elevation database. The reliability and safety of TCAS and ADS-B are improved by using the signals transmitted from a TCAS or ADS-B unit as a radar transmitter with a receiver used to receive reflections. Aircraft and other objects using spread spectrum radar are detected by using two separate receiving systems. Cross-Correlation between the outputs of the two receiving systems reveals whether a noise signal is produced by the receiving systems themselves or is coming from the outside.

14 Claims, 25 Drawing Sheets

(56) References Cited

OTHER PUBLICATIONS

Gulf of Mexico Helo Ops Ready for ADS-B, Aviation Week & Space Technology, Francis Fiorino, Feb. 26, 2007, p. 56.

Test Results from a Novel Passive Bistatic GPS Radar Using a Phased Sensor Array, Alison Brown and Ben Mathews, NAVSYS Corporation, Proceedings of ION NTM 2007, San Diego, CA, Jan. 2007. www.naysys.com/Papers/07-01-002.pdf.

Shift Register With Feedback Generates White Noise, Marc Damashek, Electronics magazine, May 27, 1976.

Shift Register Sequences, S. Golomb (Holden-Day Inc., San Francisco, 1967, and Aegean Park Press, 1982).

The ABCs of Spread Spectrum—A Tutorial, Randy Roberts, Director of RF/Spread Spectrum Consulting. http://sss-mag.com/ss.html, Oct. 7, 2009.

Undetectable Radar? (Probably Not), Erik Hundman, Defensetech. org, Aug. 3, 2006. http://www.defensetech.org/archives/002641.html.

From a Different Perspective: Principles, Practice, and Potential of Bistatic Radar by H.D. Griffiths, Dept. of Electron. & Electr. Eng., Univ. Coll. London, UK; Radar Conference, 2003. Proceedings of the International; Publication Date: Sep. 3-5, 2003; ISBN: 0-7803-7870-9; INSPEC Accession No. 7892750, Abstract.

Sensing Requirements for Unmanned Air Vehicles, AFRL's Air Vehicles Directorate, Control Sciences Division, Systems Development Branch, Wright-Patterson AFB OH, Jun. 2004, http://www.afrlhorizons.com/Briefs/Jun04/VA0306.html.

Presentation entitled, Developing Sense & Avoid Requirements for Meeting an Equivalent Level of Safety (6MB | ppt), given by Russ Wolfe, Technology IPT Lead, Access 5 Project at UVS Tech 2006. Jan. 18, 2006.

Presentation: Integration into the National Airspace System (NAS) given by John Timmerman of the FAA's Air Traffic Organization (Jul. 12, 2005).

Zone Ready for Drone, Apr. 7, 2006, on the web site for the FAA's Air Traffic Organization Employees, http://www.ato.faa.gov/DesktopDefault.aspx?tabindex=4&tabid=17&itemid=937&mid=103.

Quadrennial Roles and Missions Review Report, Department of Defense, Jan. 2009, p. 29 (PDF p. 37) www.defenselink.mil/news/Jan2009/QRMFinalReport_v26Jan.pdf.

Analog Devices, Inc. AD9481: 8-Bit, 250 MSPS, 3.3 V A/D Converter http://www.analog.com/en/analog-to-digital-converters/ad-converters/ad9481/products/product.html, 2004.

Texas Instruments C6713B http://focus.ti.com/docs/prod/folders/print/tms320c6713b.html#features, Oct. 30, 2009.

Simple Solutions for Hyperbolic and Related Position Fixes, Bertrand T. Fang, The Analytic Sciences Corp.; IEE Transactions on Aerospace and Electronic Systems, Publication Date: Sep. 1990; vol. 26, Issue: 5; pp. 748-753; ISSN: 0018-9251, p. 751 https://svn.v2.nl/andres/Documentation/TDOA/Simple_Solutions_for_TDOA-fang.pdf.

Lissajous Figures, Jed Margolin, May 2001; http://www.jmargolin.com/mtest/LJfigs.htm.

\* cited by examiner

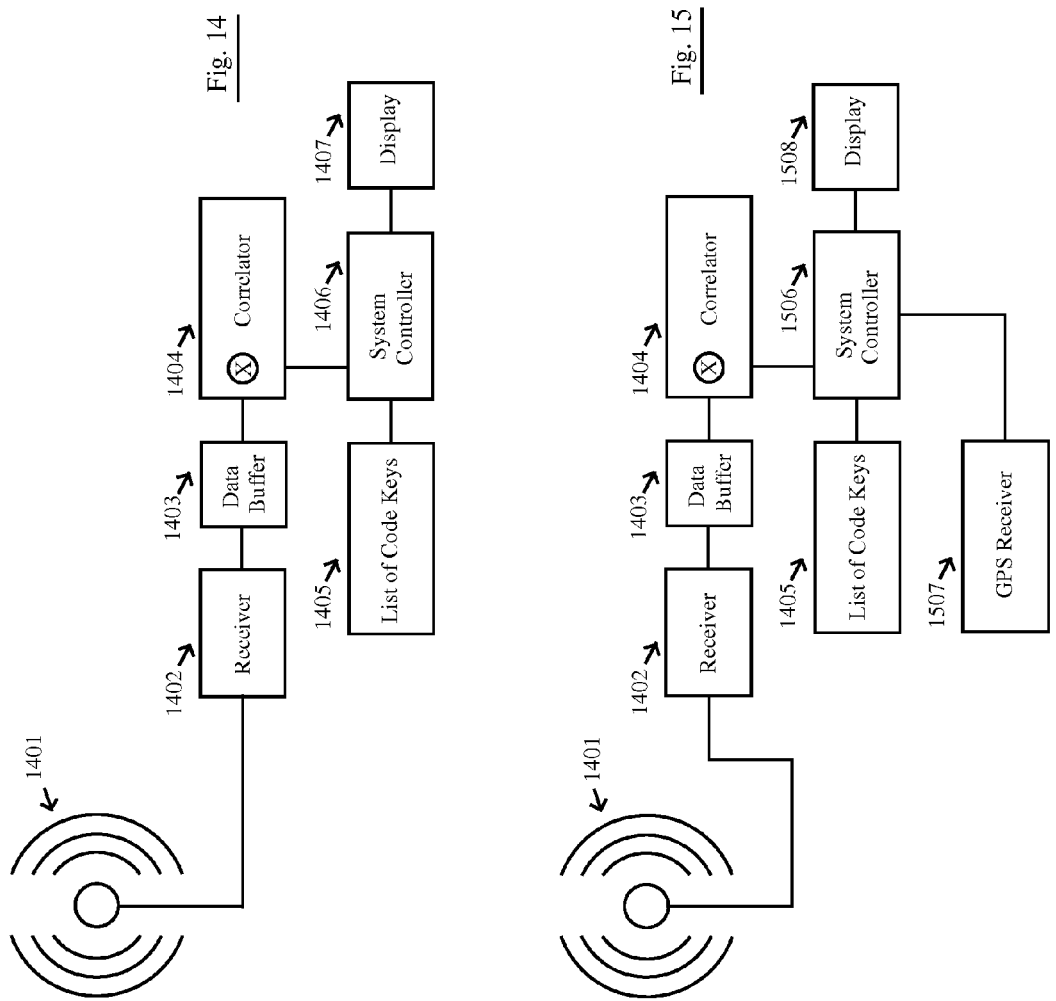

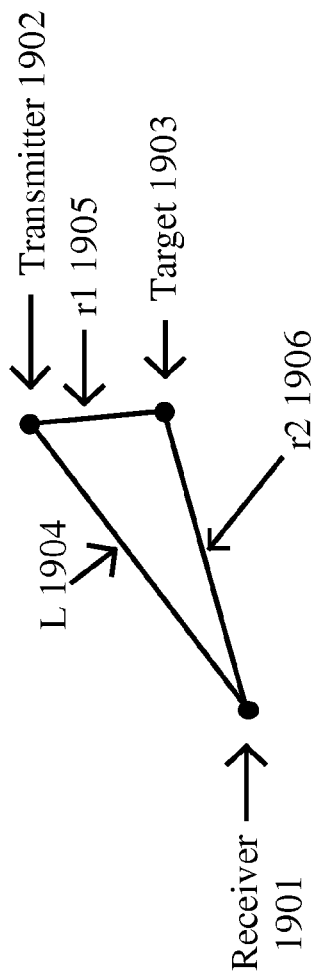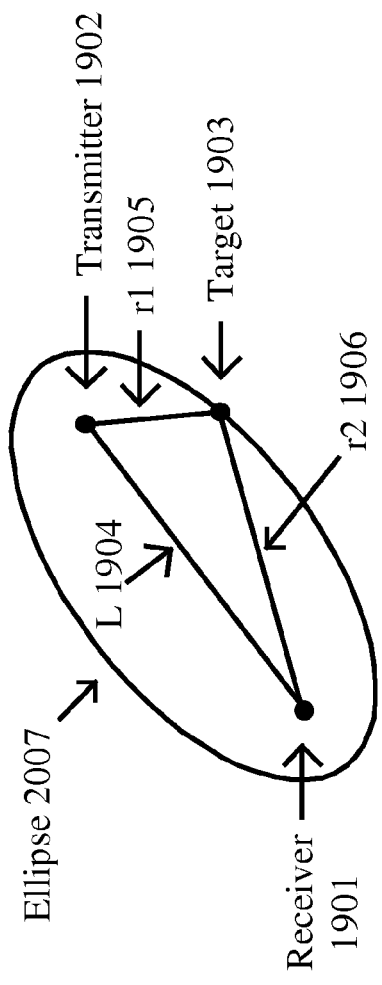
Fig. 19
Fig. 20

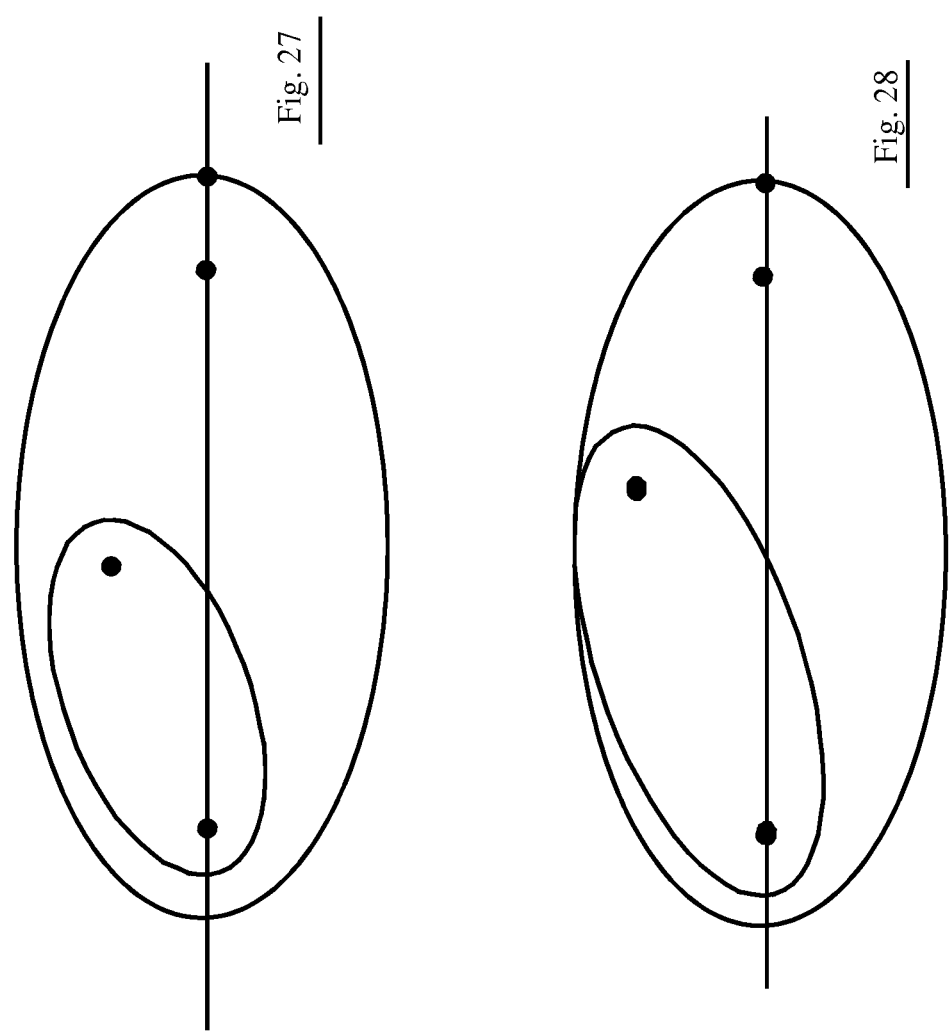

SYSTEM FOR SENSING AIRCRAFT AND OTHER OBJECTS

CROSS REFERENCES TO RELATED APPLICATIONS

The present invention is a divisional application of U.S. patent application Ser. No. 12/910,779 filed Oct. 23, 2010 and claims priority from U.S. Provisional Application No. 61/256,765 filed on Oct. 30, 2009, the contents of which are hereby incorporated by reference herein.

BACKGROUND OF THE INVENTION

1. Field of Invention

This invention relates to the field of sensing aircraft and other objects and is part of the See and Avoid (SAA) function for manned aircraft and the Detect, Sense and Avoid (DSA) function for remotely piloted vehicles (RPVs) and unmanned aerial vehicles (UAVs). RPV is an older term for UAV. "UCAV" shall mean "Unmanned Combat Aerial Vehicle." UCAV is also sometimes defined as an "Uninhabited Combat Aerial Vehicle." UCAV is a UAV that is intended for use in combat. UAS means "Unmanned Aerial System." UCAS means "Unmanned Combat Air System." The characteristics all these vehicles have in common is that there is no human pilot onboard, and although they may be operated autonomously they can also be controlled by a remotely located operator or pilot. The term UAV shall be used as a generic term for such vehicles. Detect, Sense, and Avoid (DSA) is also commonly called Sense and Avoid (SAA) since "Detect" and "Sense" mostly mean the same thing. This invention is directed to the "See" in "See and Avoid" and the "Sense" in "Sense and Avoid." It may also be used by ground stations to sense aircraft and other objects.

2. Prior Art

In an aircraft with the pilot onboard, Sense and Avoid is called See and Avoid. FAA Regulations do not give much guidance for seeing other aircraft.

Right-of-Way Rules: Except Water Operations 14 CFR §91.113(b) [IDS Cite 1]:

(b) General. When weather conditions permit, regardless of whether an operation is conducted under instrument flight rules or visual flight rules, vigilance shall be maintained by each person operating an aircraft so as to see and avoid other aircraft. When a rule of this section gives another aircraft the right-of-way, the pilot shall give way to that aircraft and may not pass over, under, or ahead of it unless well clear.

Right-of-Way Rules: Water Operations 14 CFR §91.115(a) [IDS Cite. 2]

(a) General. Each person operating an aircraft on the water shall, insofar as possible, keep clear of all vessels and avoid impeding their navigation, and shall give way to any vessel or other aircraft that is given the right-of-way by any rule of this section.

When operating under Visual Flight Rules the idea is to look out small windows providing a limited field of view and hope you see any nearby aircraft in time to avoid a collision. This is made more difficult because of the wide range of aircraft sizes and speeds. (Is it a large aircraft far away or a small aircraft much closer?) This is even more difficult under instrument flight rules where there may be no visibility.

Radar can be used to sense aircraft. Ground-based Radar allows Air Traffic Control (ATC) to direct aircraft in controlled airspace and keep aircraft safely apart. Military aircraft are generally equipped with onboard radar.

One type of collision avoidance system uses Secondary Surveillance Radar (SSR) where the Primary Surveillance Radar (PSR) used in air traffic control (ATC) detects and measures the position of aircraft and a secondary signal is transmitted that triggers a transponder in an aircraft that requests additional information from the aircraft itself such as its identity and altitude. Unlike Primary Surveillance Radar systems, which measure only the range and bearing to targets by detecting reflected radio signals, Secondary Surveillance Radar relies on its targets being equipped with a transponder which replies to each interrogation signal by transmitting its own response containing encoded data. U.S. Pat. No. 4,782,450 Method and apparatus for passive airborne collision avoidance and navigation issued Nov. 1, 1988 to Flax teaches that an aircraft can be equipped with a system that monitors the signals from the Secondary Surveillance Radar and the signals produced by each aircraft's transponders to produce its own onboard display of the locations of aircraft in the area. [IDS Cite 3]

The Traffic alert and Collision Avoidance System (TCAS) is an aircraft collision avoidance system designed to reduce the incidence of mid-air collisions between aircraft. It monitors the airspace around an aircraft by interrogating the transponders of other TCAS-equipped aircraft via the 1030 MHz frequency. It then uses the received transponder signals (via the 1090 MHz. frequency) to compute distance, bearing and altitude relative to its own aircraft. This interrogation-and-response cycle may occur several times per second. From the FAA's Introduction to TCAS II Version 7 [IDS Cite 4]

The TCAS Computer Unit, or TCAS Processor, performs airspace surveillance, intruder tracking, its own aircraft altitude tracking, threat detection, RA maneuver determination and selection, and generation of advisories. The TCAS Processor uses pressure altitude, radar altitude, and discrete aircraft status inputs from its own aircraft to control the collision avoidance logic parameters that determine the protection volume around the TCAS aircraft. If a tracked aircraft is a collision threat, the processor selects an avoidance maneuver that will provide adequate vertical miss distance from the intruder while minimizing the perturbations to the existing flight path. If the threat aircraft is also equipped with TCAS II, the avoidance maneuver will be coordinated with the threat aircraft.

Where TCAS is relied upon to prevent mid-air collisions, an aircraft that does not have the equipment installed (or TCAS is broken or has been deliberately turned off) is a hazard to itself and other aircraft in the vicinity.

The system by which an aircraft periodically transmits its identification, location, altitude, and heading is taught by U.S. Pat. No. 5,153,836 Universal dynamic navigation, surveillance, emergency location, and collision avoidance system and method issued Oct. 10, 1992 to Fraughton et al. [IDS Cite 5] and was materially adopted by the FAA as Automatic Dependent Surveillance-Broadcast (ADS-B). According to the article Gulf of Mexico Helo Ops Ready for ADS-B in Aviation Week & Space Technology (Feb. 26, 2007, page 56) [IDS Cite 6]:

By the end of 2010, FAA expects to have the ADS-B system tested and operationally acceptable for the NAS, with Houston Center providing services in the Gulf region. By 2013, all of the U.S. is scheduled to be covered with ground infrastructure.

As with TCAS, where ADS-B is relied upon to prevent mid-air collisions, an aircraft that does not have the equipment installed (or ADS-B is broken or has been deliberately turned off) is a hazard to itself and other aircraft in the vicinity.

ADS-B also comes with the risk that terrorists can use it to identify and track targets.

A passive radar system is taught by U.S. Pat. No. 5,187,485 Passive ranging through global positioning system issued Feb. 16, 1993 to Tsui, et al. [IDS Cite 7] The patent teaches a method for determining the distance from a target to an observation station, using four GPS satellites as radiation sources, and a GPS receiver at the observation station to form a bistatic radar system, wherein an angle of arrival (AOA) of the target to the observation station has been measured first. Because the signal level from the GPS satellites is already low, the signal reflected from various objects is very low, requiring the use of a large antenna or more-powerful GPS satellites. See Test Results from a Novel Passive Bistatic GPS Radar Using a Phased Sensor Array by Alison Brown and Ben Mathews, NAVSYS Corporation. [IDS Cite 8]

There are other types of radar that attempt to keep the presence and location of the emitter from being detected. Examples are Spread Spectrum, Frequency Hopping, Ultra Wideband, and Noise Radar. Although there are differences between them, what they have in common is that they are designed to transmit a signal that cannot be detected except by the originating entity. As a result, target echoes also cannot be detected except by the originating entity. They generally do this by using a much wider bandwidth than a standard radar. Spread Spectrum will be used here as an example. An example of Spread Spectrum Radar is taught by U.S. Pat. No. 5,724,041 Spread spectrum radar device using pseudorandom noise signal for detection of an object issued Mar. 3, 1998 to Inoue, et al. [IDS Cite 9].

Abstract

A radar device transmits by a transmitting part a wave whose band is spread by a PN code from a PN generator, receives at a receiving part a reflected wave from an object based on the wave and detects the object by detecting correlation between the received signal and the PN code. In this radar device, the received signal which is spread to a wide range is converted to a low-frequency band which is easy to be measured by a down converter so that a signal is generated when correlation is made by a delay of the PN code from a delay circuit, and generates a pulse signal through waveform shaping of the signal to detect the object and to measure its relative speed and distance at a processing part according to the pulse signal and the delay time.

Note that "PN" means Pseudo-Random Number. A pseudo-random number is produced by an algorithm so it is not truly random. However, it has the advantage that sequences of pseudo-random numbers can be reproduced. An example of a method of producing pseudo-random numbers is the Linear Feedback Shift Register. A simple Linear Feedback Shift Register can be used to produce white noise for testing audio equipment as taught in the article Shift Register With Feedback Generates White Noise by Marc Damashek in the May 27, 1976 issue of Electronics magazine. [IDS Cite 10] It has also been used in U.S. Pat. No. 4,159,293 Random dot generator for raster scan video displays issued Mar. 25, 1980 to Margolin (the current inventor). [IDS Cite 11]

Abstract

A Linear-Feeback-Shift-Register produces a pseudorandom sequence of bits that are used to produce a stationary random pattern of dots on a standard raster scan video display. The density of dots is adjustable as is their intensity. This dot pattern may be combined with other video sources and thus may serve as a background for the playing of TV video games, especially those of the "space war" variety. The dot pattern may also be moved as a whole under player control and thus form the basis for a novel type of video game to be described.

Linear-Feedback-Shift-Registers (LFSRs) have also been used to produce pseudo-random sequences of binary signals for use as test signals for transmission paths (U.S. Pat. No. 3,986,168 Multichannel error signal generator issued Oct. 12, 1976 Anderson) [IDS Cite 12], and as code sequences for encoding information (U.S. Pat. No. 3,515,805 Data scrambler issued Jun. 2, 1970 to Fracassi et al.). [IDS Cite 13] The theory of Linear-Feedback-Shift-Registers (LFSRs) is covered extensively in "Shift Register Sequences" by Solomon Golomb (Holden-Day Inc., San Francisco, 1967, and Aegean Park Press, 1982) [IDS Cite 14].

A very good description of spread spectrum is The ABCs of Spread Spectrum—A Tutorial by Randy Roberts, Director of RF/Spread Spectrum Consulting. [IDS Cite 15]

The problem with spread spectrum radar is that it might not be undetectable. See Undetectable Radar? (Probably Not) by Erik Hundman, Defensetech.org, Aug. 3, 2006. [IDS Cite 16]

Any entity that radiates an electromagnetic signal stands a good chance of being detected, even if spread spectrum signals are used. The use of bistatic radar avoids this problem. In bistatic radar the transmitter and the receiver are physically separated by some distance so the location of the receiver cannot be detected by tracking the transmission. Bistatic radar is commonly called passive radar and is the basis for U.S. Pat. No. 5,187,485 previously mentioned which uses the signals from the GPS system as the radiators. Other systems have been proposed using what are called "unintentional radiators." That doesn't mean the transmitters are unintentionally radiating, only that they are not radiating for the purpose of providing a signal to be used for bistatic radar. Examples are FM broadcast stations, TV broadcast stations, and cell phone base stations. See From a Different Perspective: Principles, Practice, and Potential of Bistatic Radar by H.D. Griffiths. [IDS Cite 17]. The problems with these radiators are that:

1. There might not be one where you need it.
2. They cannot be relied upon to always be transmitting.
3. In a combat zone they are prime targets for anti-radiation missiles and other attacks.

UAVs have special problems sensing other aircraft.

1. If the UAV is flown manually by a remote pilot looking at the video produced by a camera mounted in the nose of the aircraft the field of view will be too limited to see other aircraft other than those directly ahead.
2. If the UAV is flown autonomously there is no human pilot. If the flight is supervised by a human operator the problem remains that the field of view from a camera mounted in the nose of the aircraft will be too limited.
3. Military UAVs might not want to use TCAS, ADS-B, or onboard radar because it would allow other aircraft and ground facilities to detect and track them. They want to sense without being sensed.

Current Practice in Flying UAVs

The current practice in flying UAVs in civilian airspace is typified by the report Sensing Requirements for Unmanned Air Vehicles by AFRL's Air Vehicles Directorate, Control Sciences Division, Systems Development Branch, Wright-Patterson AFB OH, June 2004, which relies on computer-intelligence to use sensors to sense and avoid other aircraft. [IDS Cite 18]

According to the presentation entitled Developing Sense & Avoid Requirements for Meeting an Equivalent Level of Safety given by Russ Wolfe, Technology IPT Lead, Access 5 Project at UVS Tech 2006 this had not changed as of Jan. 18, 2006. [IDS Cite 19] Access 5 was a national project sponsored by NASA and Industry with participation by the FAA and DOD to introduce high altitude long endurance (HALE) remotely operated aircraft (ROA) to routine flights in the National Airspace System (NAS). Access 5 started in May 2004 but when NASA withdrew its support (and funding) the Industry members decided not to spend their own money and Access 5 was dissolved at the end of 2005.

The presentation Integration into the National Airspace System (NAS) given by John Timmerman of the FAA's Air Traffic Organization (Jul. 12, 2005) essentially says that under current UAS Operations in the NAS UAVs should not harm other aircraft or the public. (Page 3: "While ensuring 'no harm' to other NAS customers and public") [IDS Cite 20]

The article Zone Ready for Drone, Apr. 7, 2006, on the web site for the FAA's Air Traffic Organization Employees states that [IDS Cite 21], Since March 29, a temporary flight restriction . . . has limited access to the airspace along almost 350 miles of the border, expanding an earlier TFR near Nogales. The restriction is in effect nightly from 6 p.m. to 9 a.m., although that time can be expanded by issuance of a Notice to Airmen. Aircraft wishing to fly in the TFR when it is active must receive authorization from air traffic control prior to entry. Once in, pilots are required to maintain two-way communication with ATC and transmit a discrete transponder code.

The reason for the TFR is to enable Predator UAVs to patrol the border. The article quotes Stephen Glowacki, a Systems Safety and Procedures specialist with the FAA's Air Traffic Organization as saying:

This is an extreme situation that has been presented to us," states Stephen Glowacki, a Systems Safety and Procedures specialist with the FAA's Air Traffic Organization, stressing the nation's security. "We have been working with U.S. Customs and Border Protection to try and answer this situation."

Inserting UASs into the National Airspace System is not a simple feat. According to Glowacki, the technology and certification that will permit unmanned aircraft to "see and avoid" other air traffic is still eight to ten years away. In the mean time, a carefully controlled environment is needed.

From Quadrennial Roles and Missions Review Report, Department of Defense, January 2009, page 29 [IDS Cite 22]:

U.S. Joint Forces Command Joint UAS Center of Excellence has identified three areas necessary to ensure access to applicable classes of the National Airspace System: (1) Airworthiness Certification; (2) establishment of standardized basic UAS qualifications consistent with Federal Aviation Administration guidelines for each class of airspace; and (3) development of sense and avoid technology. Working with the Services, the U.S. Joint Forces Command Joint UAS Center of Excellence will ensure these areas are addressed during UAS development.

(Emphasis added.)

OBJECTIVES

Therefore, an objective of the present invention is to improve TCAS so that aircraft equipped with TCAS can detect aircraft not equipped with it (or TCAS is broken or has been deliberately turned off).

Another objective of the invention is to improve ADS-B so that aircraft equipped with ADS-B can detect aircraft not equipped with it (or ADS-B is broken or has been deliberately turned off).

Another objective of the invention is to detect and locate aircraft which are using spread spectrum radar in an attempt to be undetected.

Another objective of the invention is a system to detect and locate aircraft and other objects without itself being detected or located.

A further objective of the invention is an integrated bistatic spread spectrum radar system using a satellite constellation for the radar function as well as for communications.

SUMMARY OF THE INVENTION

TCAS can be improved by using the interrogation signal transmitted from a TCAS unit as a radar transmitter with a receiver to receive reflections. In a first preferred embodiment the standard TCAS antennas are used to receive the reflections of the TCAS signal. Although one of the TCAS antennas is a directional antenna, its directionality is currently limited to 90 degree quadrants. The time delays between the transmitted signal and the reflections are used to determine the range of other aircraft and are used to match the range and number of targets to the TCAS transponder signals normally received. Doppler analysis can be used to confirm the speeds of the targets. In a second preferred embodiment a separate directional receiving antenna is used to give both the range and bearing to aircraft and other objects in the vicinity of the user's aircraft even when other aircraft are not equipped with TCAS.

ADS-B can be improved by using the signal transmitted from an ADS-B unit as a radar transmitter with the ADS-B receiver used to receive reflections. In a third preferred embodiment a standard omni-directional antenna is used to receive the reflections of the ADS-B signal. The time delays between the transmitted signal and the reflections are used to determine the range of other aircraft and match the range and number of targets to the ADS-B signals normally received. Doppler analysis can be used to confirm the speeds of the targets. In a fourth preferred embodiment a directional receive antenna is used to give both the range and bearing to aircraft and other objects in the vicinity of the user's aircraft even when other aircraft are not equipped with ADS-B.

Aircraft using spread spectrum radar can be detected by using two separate receiving systems, each with its own antenna and receiver. Each receiving system is configured to have the same frequency range and bandwidth. The output of each receiver system is digitized to have the same number of samples in a frame of data. A cross-correlation is then performed between the two data frames. The noise produced by each receiver system is completely independent of each other so the internally generated noise is uncorrelated. If there is a correlation between the data frames from two receiver systems it can only have come from an external source, such as a spread spectrum signal.

In a fifth preferred embodiment each receiving system uses an omni-directional antenna, the two receiving systems are spatially separated, and the phase term (time delay) in the cross-correlation function is used to determine the bearing to the target. However, this produces the "Hemisphere Problem" as it is known in the field of Radio Direction Finding (RDF). A target on either side of the line between the two antennas produces the same time delay, and therefore the same angle. One method to determine which side of the line the target is on is to use a third antenna that is not collinear with the first two antennas. The receiving system from the third antenna produces a signal that is cross-correlated with the signal from one of the first two antennas. The other method is to use Doppler from the target to determine the target's velocity along with the change in the User's position. This is used for triangulation of the target. A good place to put the first two antennas are at the ends of the wings, especially in winglets made of non-conducting composites with one antenna in each winglet. The third antenna may be placed either in the nose or the tail. Alternatively, the first two antennas may be placed in the nose and in the tail with the third antenna placed at the end of either wing.

A sixth preferred embodiment adds a second pair of receiving systems using omni-directional antennas. The pair of antennas in the first receiving system are located physically apart from each other and from the first pair of receiving antennas. The bearing produced by the second pair of receiving systems is used for performing triangulation with the first pair of receiving systems to determine the range to the target.

In a seventh preferred embodiment, to improve the Probability of Intercept (POI), two co-located directional antennas are used. In this mode the antennas must be pointed in the same direction. However, this improvement in POI comes at the expense of obtaining range information. Bearing information is produced by the direction of the antennas since it is no longer possible to use the phase information term in the cross-correlation function to determine the bearing to the target.

In an eighth preferred embodiment the two directional antennas are spatially separated. Bearing information is produced by the direction of the antennas and triangulation is used to produce range information. Since a correlated signal is produced only when both antennas are pointed at the target the antenna angles must be coordinated.

In a ninth preferred embodiment a second pair of co-located receiving systems is added, spatially separated from the first pair of co-located receiving systems. Triangulation between the first pair of receiving systems and the second pair of receiving systems is used to determine the range to the target. This has the advantage that each pair of receiving systems may independently search for the presence of a target. When a target is detected by one pair of receiving systems the other pair of receiving systems is brought to bear on it for triangulation to determine its range.

The use of directional antennas requires the ability to aim the antennas. This can be done by physically aiming the antennas (such as when the antennas use parabolic dish reflectors) or by using active electronically scanned arrays. Because each area must be separately scanned the time to detect and locate spread spectrum targets is increased according to the directionality of the antennas. The use of directional antennas reduces the radio frequency noise received that is produced by the Sun, except when the antennas are pointed at the Sun. (The level of the sun's contribution depends on the solar flux.) It also reduces the noise received that is produced by the Earth (about 290K.), except when the antennas are pointed at the Earth.

The technology requirements for performing a reasonably fast digital cross-correlation on two wideband signals are formidable: a fast Analog-to-Digital Converter (ADC) and a fast Digital Signal Processor (DSP). However, fast ADCs are available, such as the AD9481 (8-Bit, 250 MSPS) by Analog Devices Inc. [IDS Cite 23]. Fast and inexpensive DSPs are available due to their increasing use in consumer products. An example is the C6713B from Texas Instruments. [IDS Cite 24]

Operating at 300 MHz, the C6713B delivers up to 1800 million floating-point operations per second (MFLOPS), 2400 million instructions per second (MIPS), and with dual fixed-/floating-point multipliers up to 600 million multiply-accumulate operations per second (MMACS).

If additional processing power is required, the cross-correlation function is very amenable to parallel processing.

A system and method for detecting and locating aircraft and other objects without being detected or located will now be described.

As previously discussed, any entity that radiates an electromagnetic signal stands a good chance of being detected and possibly located, even if spread spectrum signals are used. The use of bistatic radar avoids this problem. Systems have been proposed using "unintentional radiators" such as FM broadcast stations, TV broadcast stations, and cell phone base stations. However, these sources cannot be relied upon to always be transmitting, and in a combat zone they are prime targets for anti-radiation missiles and other attacks. Because of the likelihood that any radiator can be detected and probably tracked, the solution is to make the transmitter difficult to attack.

One or more high-flying aircraft can be used as the transmitting source(s) for a bistatic radar system. One disadvantage of this method is that the technology race between aircraft and anti-aircraft missiles (and directed energy weapons) favors anti-aircraft missiles and directed energy weapons. An example of a directed energy weapon is taught by U.S. Pat. No. 6,377,436 Microwave Transmission Using a Laser-Generated Plasma Beam Waveguide issued Apr. 23, 2002 to Margolin (the present inventor). [IDS Cite 25] Another disadvantage of using high-flying aircraft is that it requires the close coordination of multiple assets.

The solution is to go higher and use a permanently orbiting constellation of satellites. It can be called the Global Radar System (GRS). Although this might resemble the method taught in U.S. Pat. No. 5,187,485 Passive ranging through global positioning system the purpose of the satellites is different and can be optimized to the mission.

1. GRS satellites will use higher power than GPS.
2. The precise position of each GRS satellite does not need to be known, only the precise range and bearing to the User. The use of GPS should not be a requirement for the operation of the GRS.
3. The GRS satellites will produce a secured spread-spectrum signal. Although GPS also uses a spread-spectrum signal the details are publicly available so manufacturers can make and sell the GPS receivers to the general public.
4. The GPS constellation is in orbital planes approximately 20,200 km above the Earth (Medium Earth Orbit or MEO). The GRS constellation should be in Low Earth Orbit (LEO) in the range of 160 km-2,000 km.

One of the reasons for using LEO is that it is desirable to keep the existence of GRS a secret and it would be difficult to secretly launch and operate a constellation of satellites. Therefore, the GRS function should be hidden in a satellite constellation that has a non-secret mission. A prime candidate is a new satellite system for providing communications with UAVs around the world. For various reasons, communications with UAVs should have low latency, and a LEO system will have lower latency than a MEO system. The military's increasing use of UAVs and need for dedicated low-latency bandwidth justifies a dedicated satellite system using spread spectrum communications. The function of also providing a spread-spectrum signal for bistatic radar does not have to be publicly revealed. The need to have these "communication" satellites always transmitting can be explained as "continuous monitoring of system health." Indeed, there is value for a User to know that the communications system is working and that a channel is available. It reduces POI by avoiding unnecessary transmissions. POI can also be reduced by using a directional antenna for transmitting and aiming it at an available satellite with the lowest POI. For example, the satellite most directly overhead may have the lowest POI in many situations. This presents the opportunity to provide an integrated bistatic spread spectrum radar system using a satellite constellation for the radar function as well as for communications.

It is desirable to have the capability for GRS satellite-to-satellite communications, preferably using optical links.

The following example is for a 2D system which will be expanded later to a 3D system. A satellite constellation is being used, and each satellite transmits a spread spectrum signal and has its own unique code key. The code key may be a PN key or it may be produced by other means. It is assumed that the User is receiving a signal in straight paths from one or more satellites and that there is a straight path from the satellites to the target and from the target to the User and that the range and bearing from the User to each satellite is known. As a result, the length of the path from each satellite reflected from the target is also known.

The distance from each satellite to the User can be known in several ways. One method is to use GPS for the location of the User and for the satellites to broadcast their GPS positions (regardless of how their positions are determined). Another method is for the User to use GPS, an accurate clock, and an ephemeris that gives the locations of satellites for a period of time in advance. Another method is for the User to have an accurate clock and for the satellites to include the time of transmission in their signals. Another method is for the User to send a signal to the appropriate satellite which responds with a signal that the User can use to get the range and bearing to that satellite. Thereafter, Inertial Navigation may be used. This method has the advantage that it does not use GPS but would be limited to those times when radio silence by the User is not necessary. A further method is to build a simplified form of Global Navigation Satellite System (GNSS) into GRS (and kept secret) as a military backup to GPS. It does not have to be as accurate as GPS because its purpose is to sense other aircraft in order to prevent a collision. It is not necessarily for delivering weapons, which has the opposite goal.

When the User receives a reflected signal from the target a cross correlation is performed using the code keys for the satellites in order to determine which satellite the reflected signal is coming from. The use of an ephemeris would allow the User to test only for those satellites that are visible.

Where the User determines the position of the satellite using GPS, an accurate clock, and an ephemeris it is not necessary for the User to receive a direct signal from the satellite, only the reflection from the target.

At this point the User knows the total length of the path from a first satellite to the target and then to the User and wants to know the length of the path from the target to himself. The User also knows the length of the path from the first satellite to himself. Mathematically, this is the definition of an ellipse. The User and the first satellite are at the foci and the target is somewhere on the ellipse.

When a second satellite is added, a second ellipse is formed. The User is at one of the foci, the second satellite is at the other. The first ellipse and the second ellipse intersect at only two points, with the target at one of the points.

When a third satellite is added, a third ellipse is formed. Again, the User is at one of the foci and the third satellite is at the other. The three ellipses intersect at only one point. That is where the target is.

A 3D system is more complicated because the geometric figure produced between each satellite and the User is not a 2D planar ellipse. Picture an ellipse rotating around the axis between the User and the satellite. The figure that each Satellite produces is an ellipsoid (a prolate spheroid) that looks remarkably like a football (U.S. or Canadian).

Satellite 1 produces an ellipsoid with the User at one of the foci and the satellite at the other. The target is somewhere on the surface of the ellipsoid.

When a second satellite is added, a second ellipsoid is formed. The User is at one of the foci, the second satellite is at the other. The first ellipsoid and the second ellipsoid intersect and produce an ellipse. The reason for this is because they share a common focus. [IDS Cite 26]

When a third satellite is added, a third ellipsoid is formed. The User is at one of the foci, the third satellite is at the other. The first and second ellipsoids and the third ellipsoid intersect at two points, with the target at one of the two points.

When a fourth satellite is added, a fourth ellipsoid is formed. The User is at one of the foci, the fourth satellite is at the other. The first three ellipsoids and the fourth ellipsoid intersect at only one point. That is where the target is.

The geometry that has been described might not be obvious to someone versed mainly in GPS geometry. GPS uses only three satellites to determine the User's position in three dimensions. (A fourth satellite is used for time correction.) The reason for this difference is because instead of using only the signal received directly from the satellite, the User is receiving both the direct signal and a signal reflected from the target. A line from the target meets the line from the User to the satellite at a 90 degree angle and forms the radius of a circle. The target can be anywhere on that circle. That is why the additional satellite is needed to determine the position of the target.

There is something to note. Not all ellipses that share a focus point will intersect. However, in this case they must intersect because the ellipses were created by reflections from the same target, and the target cannot be in more than one place at the same time.

The issue of multiple targets will now be discussed. A single target will produce four reflections, one from each satellite. A second target will produce four more reflections unless the geometry of the User and the targets causes one or more of the reflections to coincide. This is unlikely, but possible. A third target produces four more reflections, and so on. A User receiving system using a single omni-directional antenna will have to sort out all these reflections and perform the calculations looking for a single possible solution. To provide better results, Doppler analysis of each reflection can be performed so that the various reflected signals can be matched together. The Doppler shift of each reflected signal is a result of the velocity of the target, the velocity of the satellite producing the signal that is reflected, and the velocity of the User. Another solution is for the User system to use directional antennas.

The geometry shows that several system configurations are possible.

1. System 0—It is not necessary to receive any signals directly from any satellites. Only the signals reflected from the target are needed. The User tries all of the code keys for all the satellites or uses an ephemeris to try only the code keys for the satellites that are in view. A signal that is detected is subjected to the various treatments described in the previous section on detecting spread spectrum radar. It may be possible to use the radio frequency emanations from the Sun and not use any satellites, but only during daytime.
2. System 1—The direct and reflected signal from only one satellite is used. This detects the presence of the target but its position can be anywhere on an ellipsoid, which is better than nothing. A directional antenna is used to scan those areas corresponding to the surface of the ellipsoid.
3. System 2—The direct and reflected signals from two satellites are used. This detects the presence of the target and locates its position to an ellipse. A directional antenna is used to scan the ellipse.
4. System 3—The direct and reflected signals from three satellites are used. This detects the presence of the target and narrows its position down to only two positions. A directional antenna is used to determine which position the target is in.
5. System 4—The direct and reflected signals from four satellites are used to detect the presence and position of the target. Only a single omni-directional antenna is needed.

Although it is anticipated that the system will use microwave frequencies, the use of lower frequencies would make it possible to detect stealth aircraft. There are tradeoffs involving the frequency used, the resolution that can be achieved, and the ability to detect stealth aircraft. The lower the frequency the lower the resolution. A lower frequency requires either a larger antenna or an antenna of reduced efficiency. However, a lower frequency increases the ability to detect stealth aircraft. Stealth aircraft commonly employ reflecting surfaces and/or microwave-absorbing surface material. As the wavelength becomes longer and approaches the dimensions of the aircraft, the reflecting surfaces no longer produce localized reflections. And there is a frequency below which energy-absorbing material becomes ineffective depending on the specifics of the material.

In view of the foregoing, a tenth preferred embodiment for sensing aircraft and other objects uses bistatic radar with a spread spectrum signal transmitted from remotely located sources. In an eleventh preferred embodiment an integrated bistatic spread spectrum radar system uses a satellite constellation for the radar function as well as for communications.

In a twelfth preferred embodiment the satellite constellation described above can also be used for long baseline radar interferometry in order to validate the digital terrain elevation database. The distance between satellites provides for a long baseline and the use of multiple satellites simultaneously improves the accuracy of the terrain measurements.

BRIEF DESCRIPTION OF THE DRAWINGS

The invention may best be understood by referring to the following description and accompanying drawings which illustrate the invention. In the drawings:

FIG. 14 is a general illustration showing the User equipment suitable for use in a spread spectrum radar using a satellite constellation as the radar transmitters and an omni-directional receive antenna.

FIG. 15 is a general illustration showing another form of User equipment suitable for use in a spread spectrum radar using a satellite constellation as the radar transmitters and an omni-directional receive antenna.

FIG. 19 is a general illustration showing the geometry of a bistatic radar.

FIG. 20 is a general illustration showing that the geometry of a bistatic radar describes an ellipse.

FIG. 27 is a general illustration showing an ellipse that does not intersect another ellipse even though they share a focus.

FIG. 28 is a general illustration showing an ellipse that intersects another ellipse at only one point even though they share a focus.

DETAILED DESCRIPTION

In the following description, numerous specific details are set forth to provide a thorough understanding of the invention. However, it is understood that the invention may be practiced without these specific details. In other instances well-known circuits, structures, and techniques have not been shown in detail in order not to obscure the invention.

Figure 1:
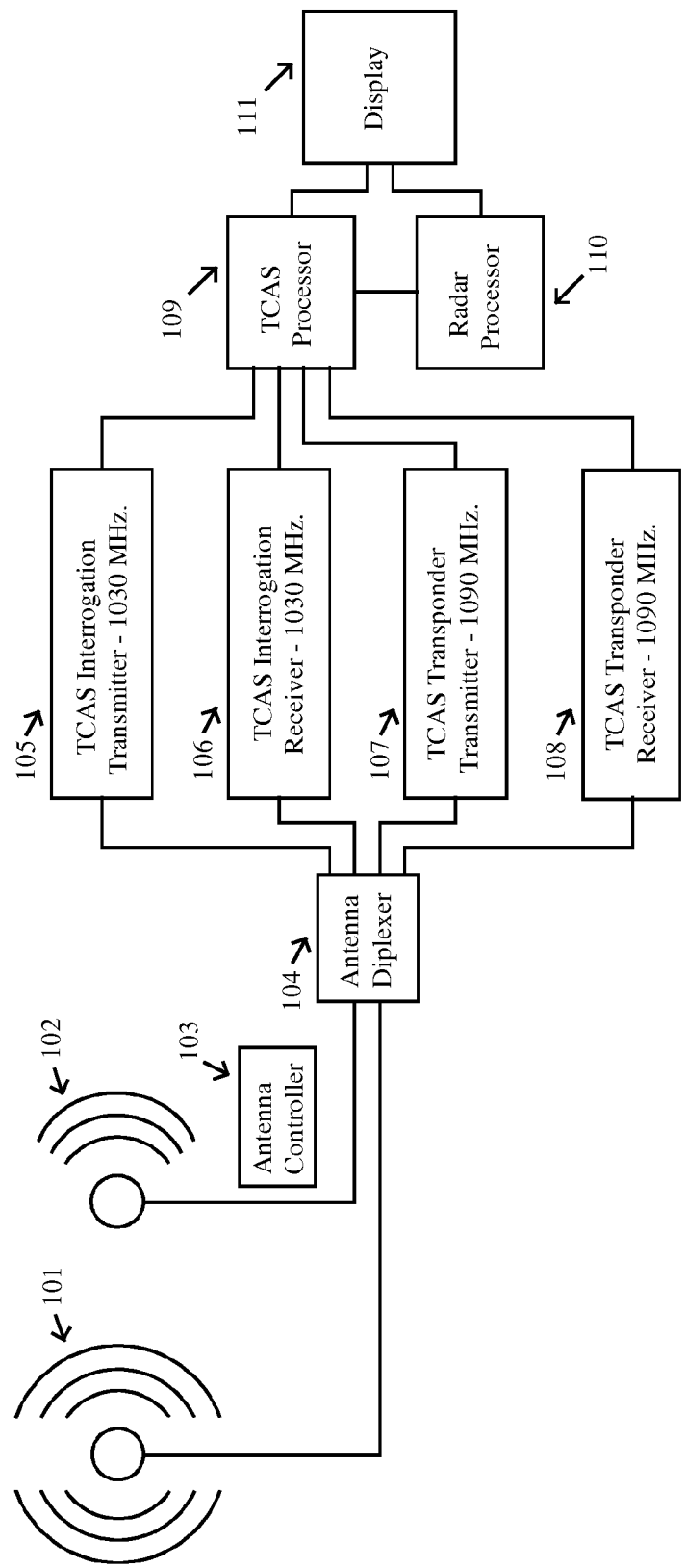
FIG. 1 is a general illustration showing a TCAS system used as a radar, using standard TCAS antennas.

FIG. 1 is a general illustration showing a TCAS system used as a radar, using standard TCAS antennas. TCAS Interrogation Receiver 106 listens for Interrogation signals from other aircraft. When it receives one, TCAS Transponder Transmitter 107 sends out a signal containing the unique ID number of the aircraft and its altitude. TCAS Interrogation Transmitter 105 periodically (and randomly) sends out an Interrogation signal that other TCAS-equipped aircraft respond to. These transponder responses are received by TCAS Transponder Receiver 108. There are at least two antennas: Omni-Directional Antenna 101 and Directional Antenna 102 which is under the control of Antenna Controller 103. Directional Antenna 102 and Antenna Controller 103 may be in the form of several directional antennas which may be selected in turn or used simultaneously. Antenna Diplexer 104 is used to select and/or combine Omni-Directional Antenna 101 and Directional Antenna 102 and route the signals (receiving and transmitting) to the appropriate piece of equipment. The preceding operations are under the control of TCAS Processor 109. The time delay between when the TCAS Interrogation signal is sent out by TCAS Interrogation Transmitter 105 and when a transponder signal from other aircraft is received by TCAS Transponder Receiver 108 is used to determine the range to the responding aircraft.

TCAS operation is improved by using the signal produced by TCAS Interrogation Transmitter 105 as a radar with reflected signals received by TCAS Interrogation Receiver 106 under the control of TCAS Processor 109 and Radar Processor 110. The results are displayed on Display 111.

If the number and range of targets reported by radar do not match the number and range of Aircraft reported by TCAS then there is an aircraft out there that does not have TCAS or it is broken or has been disabled.

Figure 2:
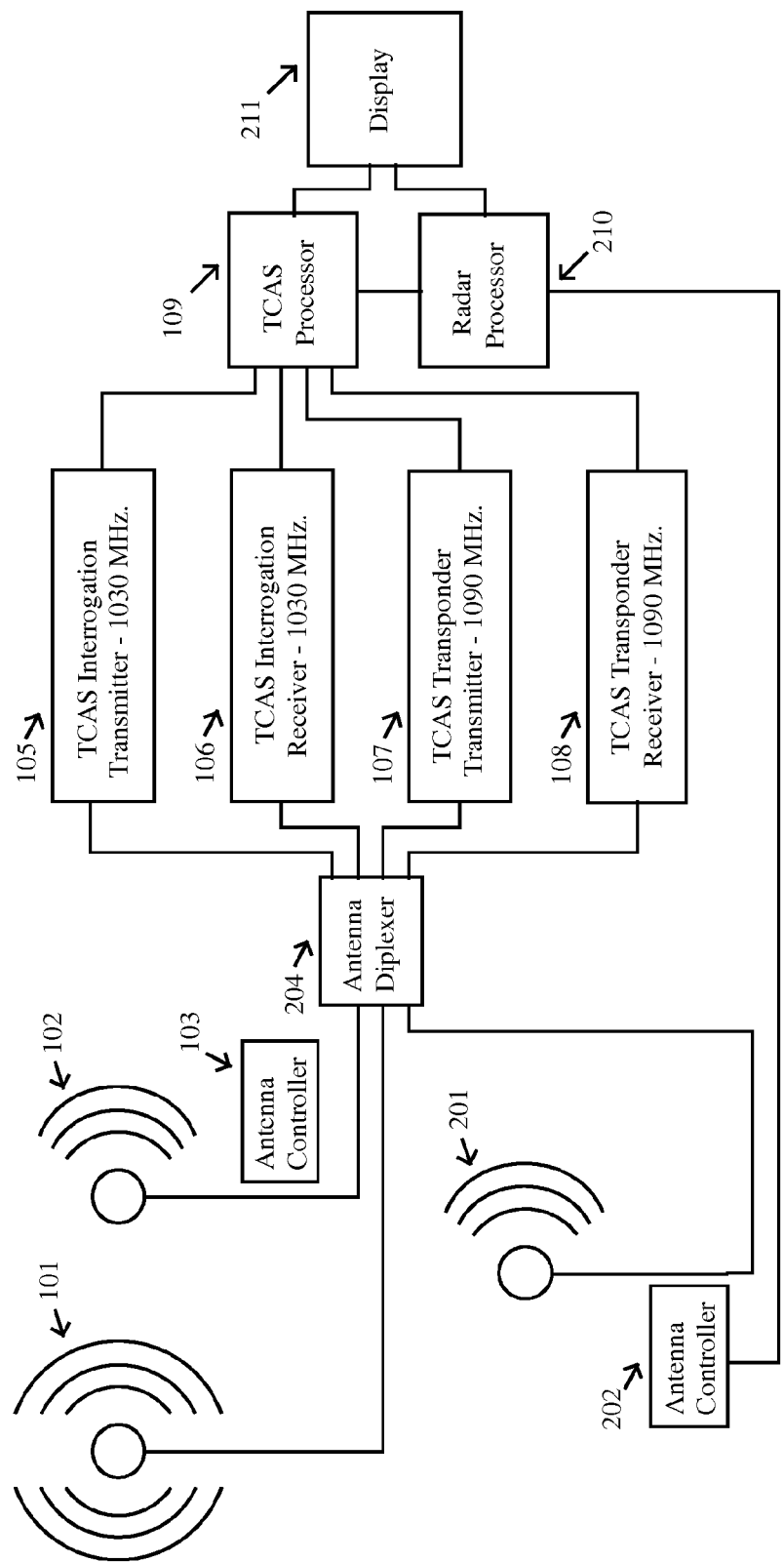
FIG. 2 is a general illustration showing a TCAS system used as a radar, using a separate directional receiving antenna.

In FIG. 2, a separate directional antenna (Antenna 201) is used to receive the reflected signals. The advantage of using a separate antenna for this function is that it can be made to be more directional than the standard Directional Antenna 102 used by TCAS. Directional Antenna 201 is controlled by Antenna Controller 202 under the direction of Radar Processor 210 which also controls the radar function through TCAS Processor 109. Antenna Diplexer 204 is used to select and/or combine Omni-Directional Antenna 101, Directional Antenna 102, and Directional Antenna 201 and route the signals (receiving and transmitting) to the appropriate piece of equipment. Directional Antenna 201 and Antenna Controller 202 may be a system that mechanically aims Directional Antenna 201 or the combination may be an electronically scanned array.

The results are displayed on Display 211.

If the number, range, and bearing to targets reported by radar do not match the number, range, and bearing of aircraft reported by TCAS then there is an aircraft out there that does not have TCAS or it is broken or has been disabled.

Figure 3:
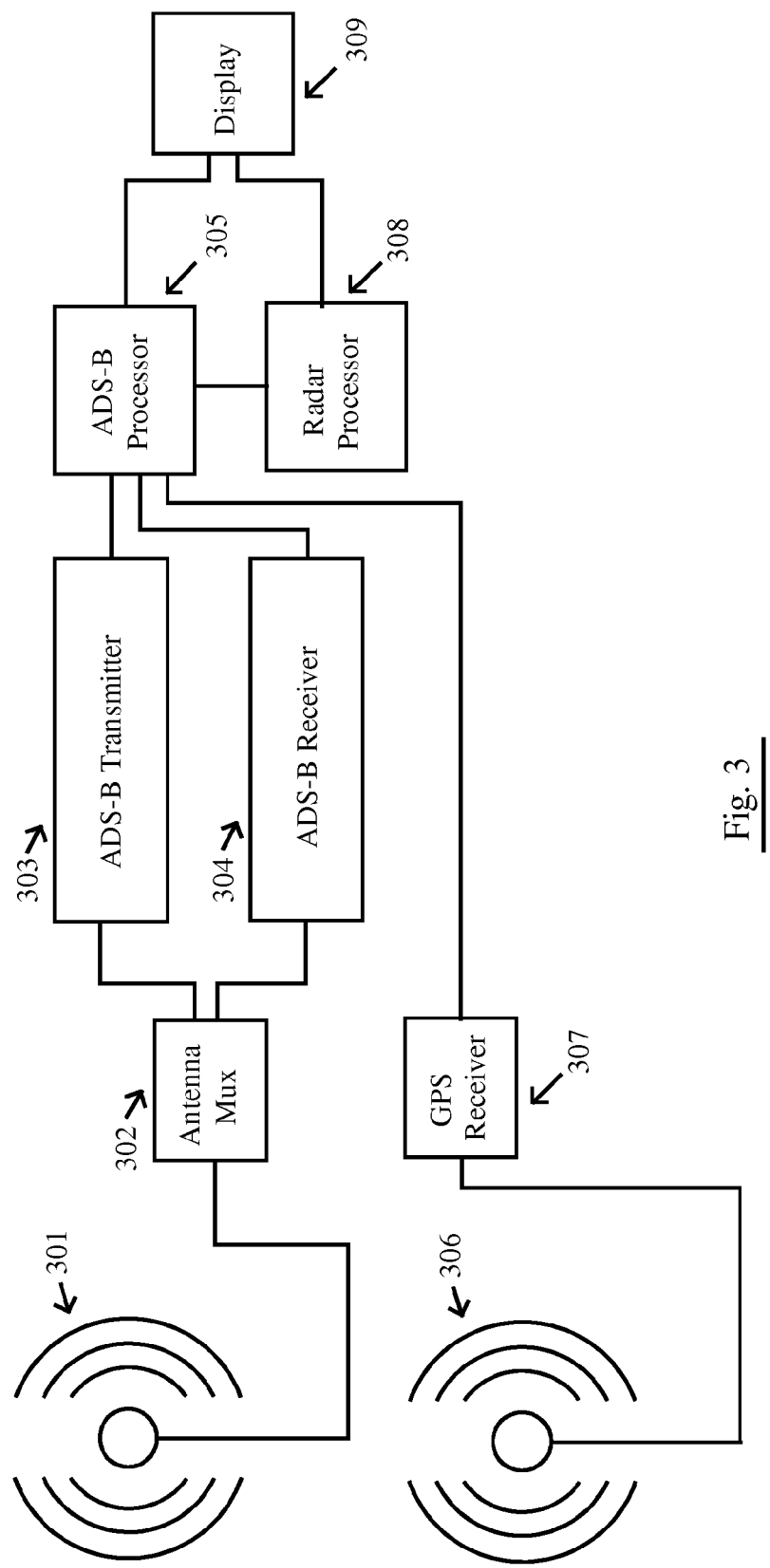
FIG. 3 is a general illustration showing an ADS-B system used as a radar, using omni-directional antennas.

FIG. 3 is a general illustration showing an ADS-B system used as a radar, using omni-directional antennas. ADS-B Transmitter 303 periodically transmits a message containing the present aircraft's unique ID, GPS coordinates, and other data using Omni-Directional antenna 301. When ADS-B Transmitter 303 is not transmitting, ADS-B Receiver 304 is listening for messages transmitted by other aircraft containing their unique ID, GPS coordinates, and other data. An Antenna Multiplexer (Antenna Mux 302) is used to route the signals from Omni-Directional Antenna 301 to ADS-B Transmitter 303 and ADS-B Receiver 304. Omni-Directional Antenna 306 is used with GPS Receiver 307 to provide the GPS coordinates of the present aircraft. All of this is controlled by ADS-B Processor 305.

ADS-B operation is improved by using the signal produced by ADS-B Transmitter 303 as a radar with reflected signals received by ADS-B Receiver 304 under the control of ADS-B Processor 305 and Radar Processor 308. The results are displayed on Display 309.

If the number and range of targets reported by radar do not match the number and range of aircraft reported by ADS-B then there is an aircraft out there that does not have ADS-B or it is broken or has been disabled.

Figure 4:
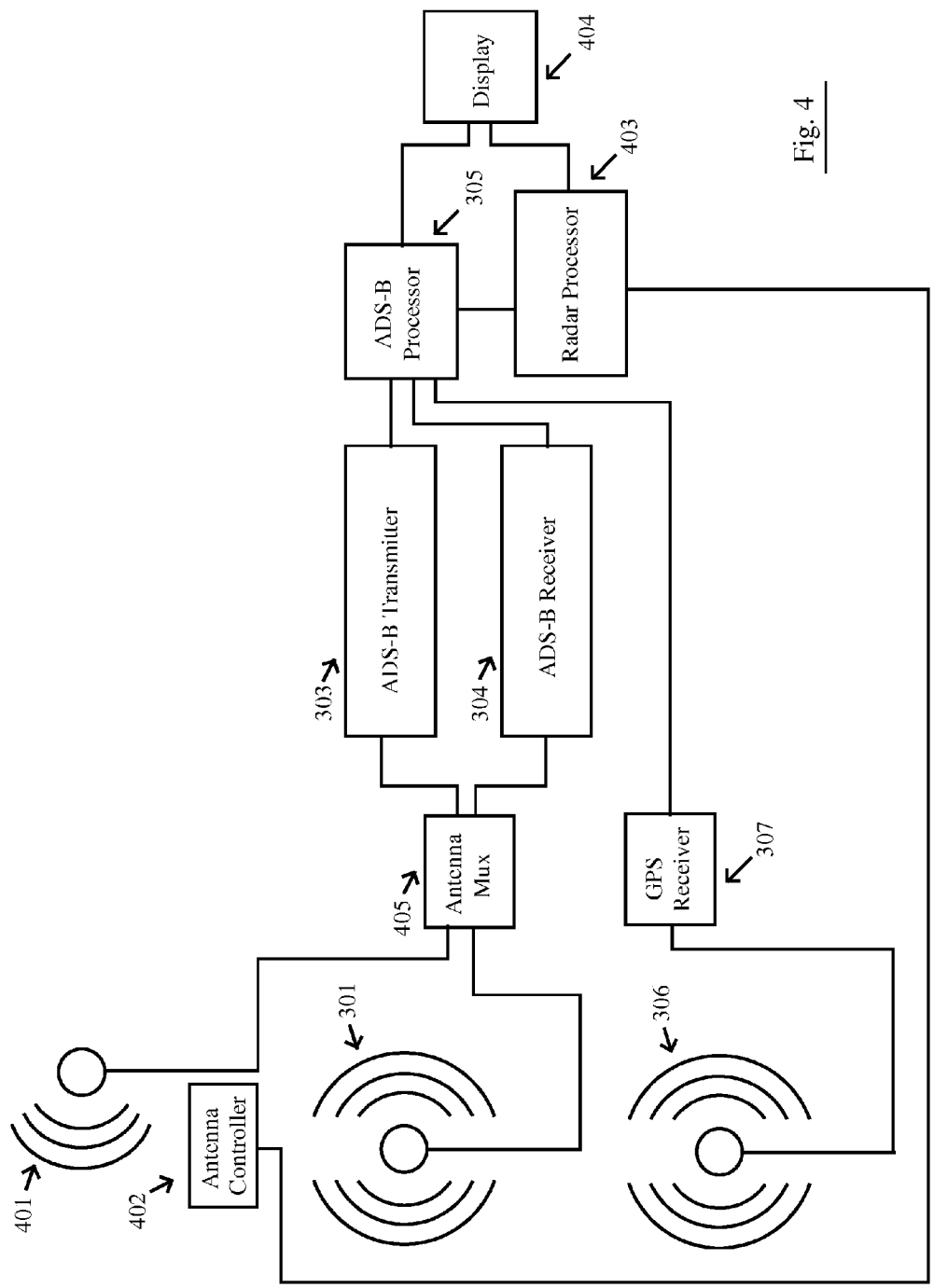
FIG. 4 is a general illustration showing an ADS-B system used as a radar, using a separate directional receiving antenna.

In FIG. 4, a separate directional antenna (Directional Antenna 401) is selected by Antenna Mux 405 to receive the reflected signals. The advantage of using a separate antenna for this function is that it is directional, as opposed to Omni-Directional Antenna 301. Directional Antenna 401 can also be used by ADS-B Transmitter 303 in order to strengthen radar returns from a specific target or to increase the range of the system in a specific direction.

Directional Antenna 401 is controlled by Antenna Controller 402 under the direction of Radar Processor 403 which also controls the radar function through ADS-B Processor 305. Directional Antenna 401 and Antenna Controller 402 may be a system that mechanically aims Directional Antenna 401 or the combination may be an electronically scanned array.

The results are displayed on Display 404.

Figure 5:
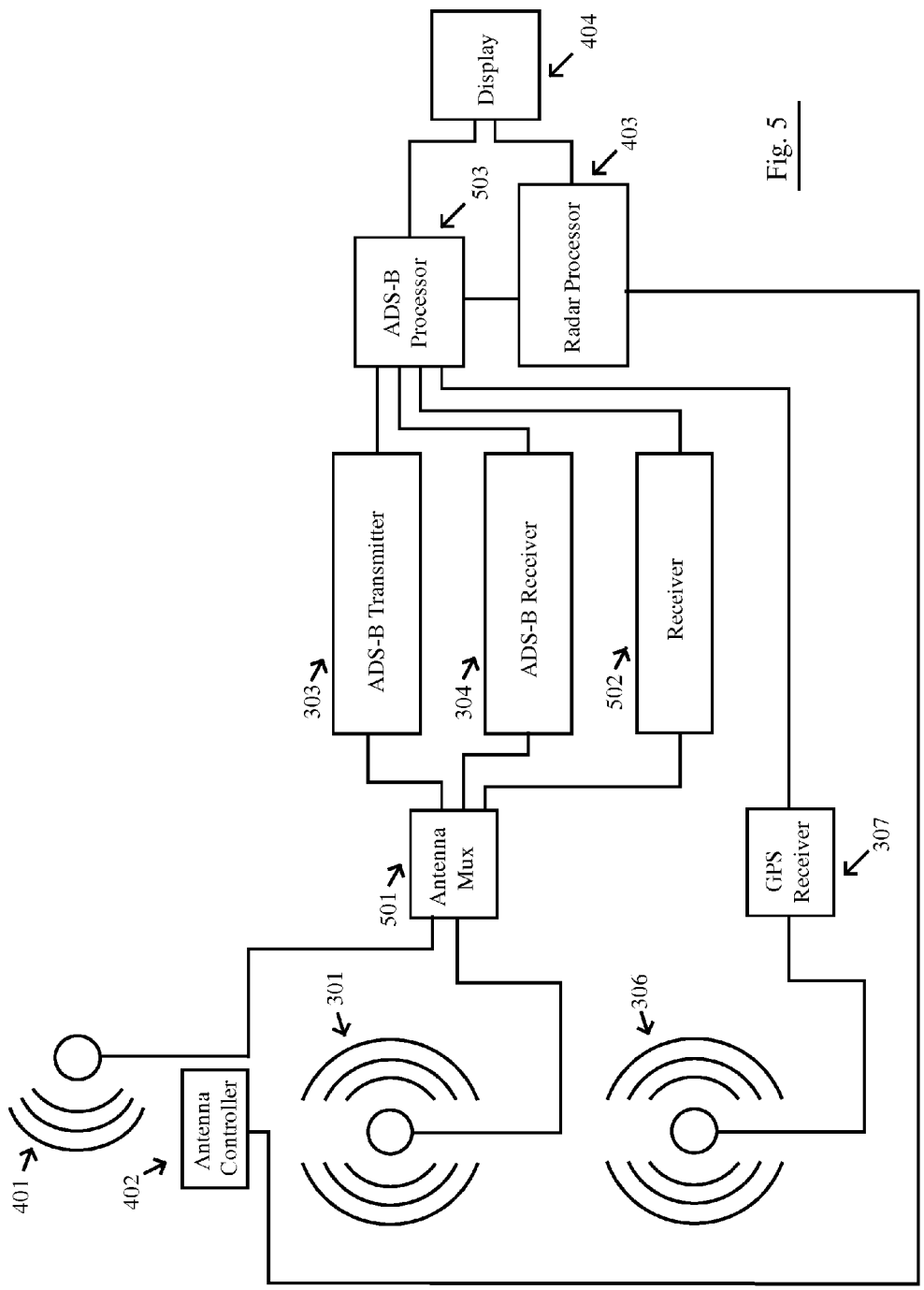
FIG. 5 is a general illustration showing an ADS-B system used as a radar, using a separate directional receiving antenna and a separate receiver.

In FIG. 5, as an alternative to sharing ADS-B Receiver 304, Directional Antenna 401 can be used with its own receiver. Antenna Mux 501 routes Directional Antenna 401 to Receiver 502 whose output goes to ADS-B Processor 503 to make it possible to receive and process radar returns without the risk of missing ADS-B messages from other aircraft.

If the number, range, and bearing of targets reported by radar do not match the number, range, and bearing of aircraft reported by ADS-B then there is an aircraft out there that does not have ADS-B or it is broken or has been disabled.

Figure 6:
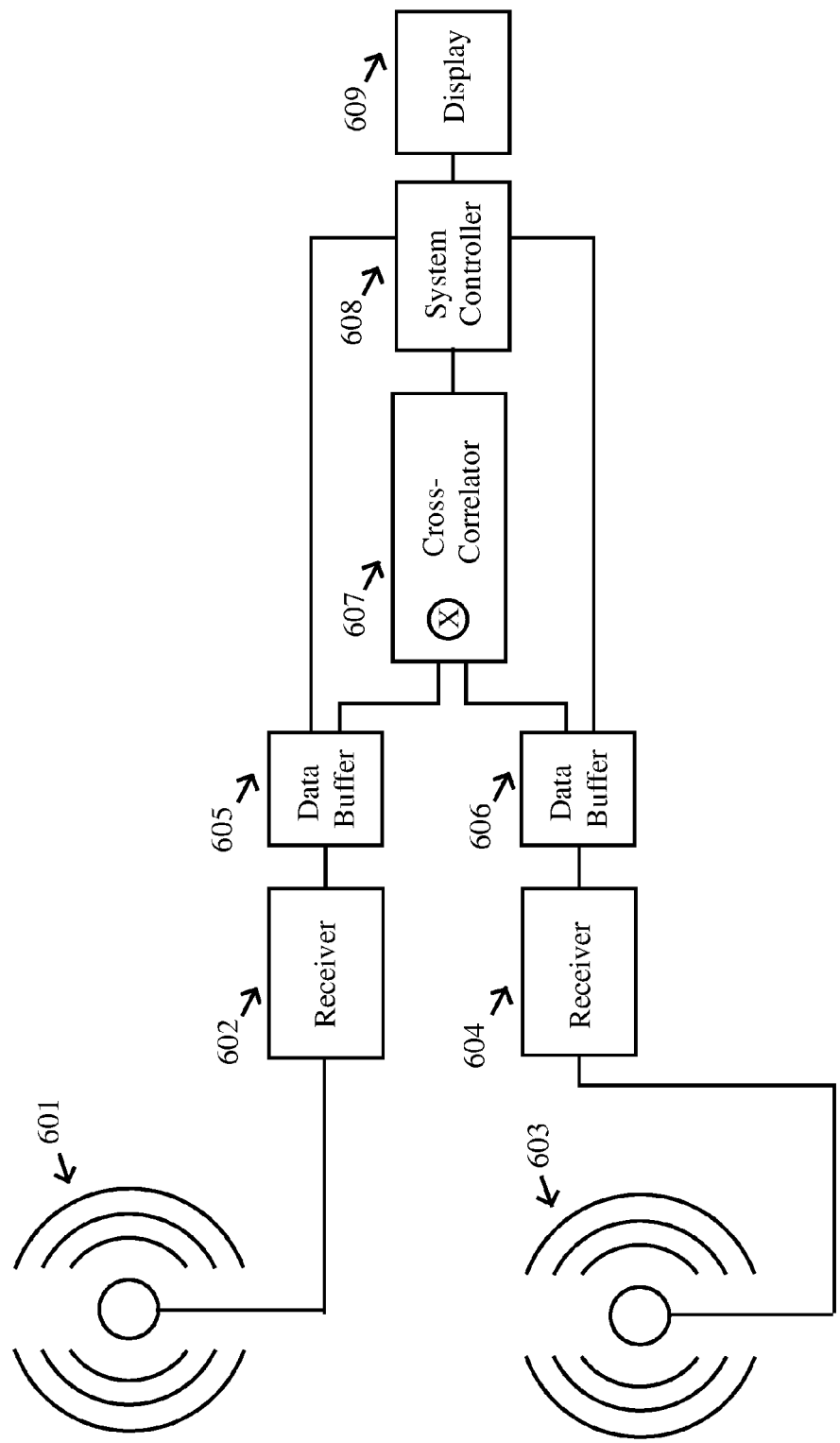
FIG. 6 is a general illustration showing a method for detecting spread spectrum radar and determining its bearing, using two omni-directional antennas.

FIG. 6 is a general illustration showing a method for detecting spread spectrum radar and determining its bearing using two receiving systems with omni-directional antennas.

Omni-Directional Antenna 601 and Receiver 602 make up the first receiving system. Omni-Directional Antenna 603 and Receiver 604 make up the second receiving system. The data from Receiver 602 is stored in Data Buffer 605. The data from Receiver 604 is stored in Data Buffer 606. The data in Data Buffer 605 and Data Buffer 606 are used by Cross-Correlator 607 under control of System Controller 608. The results are displayed on Display 609.

Figure 7:
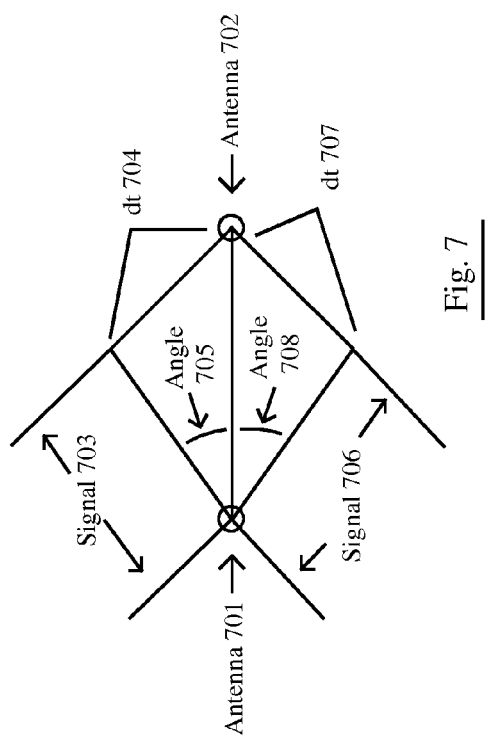
FIG. 7 is a general illustration showing why there is a "hemisphere problem" in Radio Direction Finding with two omni-directional antennas.

The noise produced by each receiver system is completely independent of each other so the internally generated noise is uncorrelated. If there is a correlation between the data frames from two receiver systems it can only have come from an external source, such as a spread spectrum signal. The phase term (time delay) in the cross-correlation function is used to determine the bearing to the target subject to the "Hemisphere Problem" which occurs because a target on either side of the line between the two antennas produces the same time delay, and therefore the same angle. Referring to FIG. 7, Antenna 701 and Antenna 702 both receive Signal 703 from a target. Antenna 702 receives Signal 703 later than Antenna 701. Time translates to distance dt 704 which produces Angle 705. However, Antenna 702 could also receive Signal 706 from a target later than Antenna 701 and with the same delay. Distance dt 707 is the same as distance dt 704 so that Angle 708 is the same as Angle 705.

Figure 8:
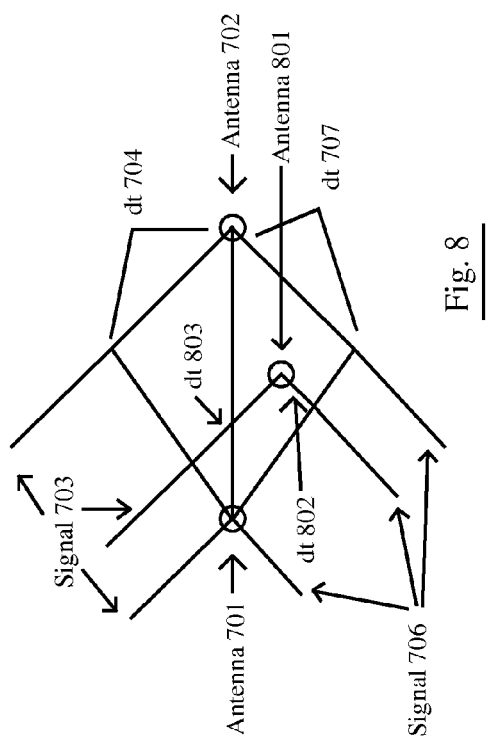
FIG. 8 is a general illustration showing the addition of an additional antenna to solve the "hemisphere problem" in Radio Direction Finding.

In FIG. 8 a third receiving system is added with Antenna 801 that is not collinear with Antenna 701 and Antenna 702. Signal 703 takes longer to arrive at Antenna 801 than does Signal 706 (distance dt 803 versus distance dt 802). The time delay of the signal received by Antenna 801 is compared to the two calculated values based on the geometry of Antennas 701, 702, and 801. Thus, it is determined whether the signal is Signal 703 or Signal 706.

Figure 9:
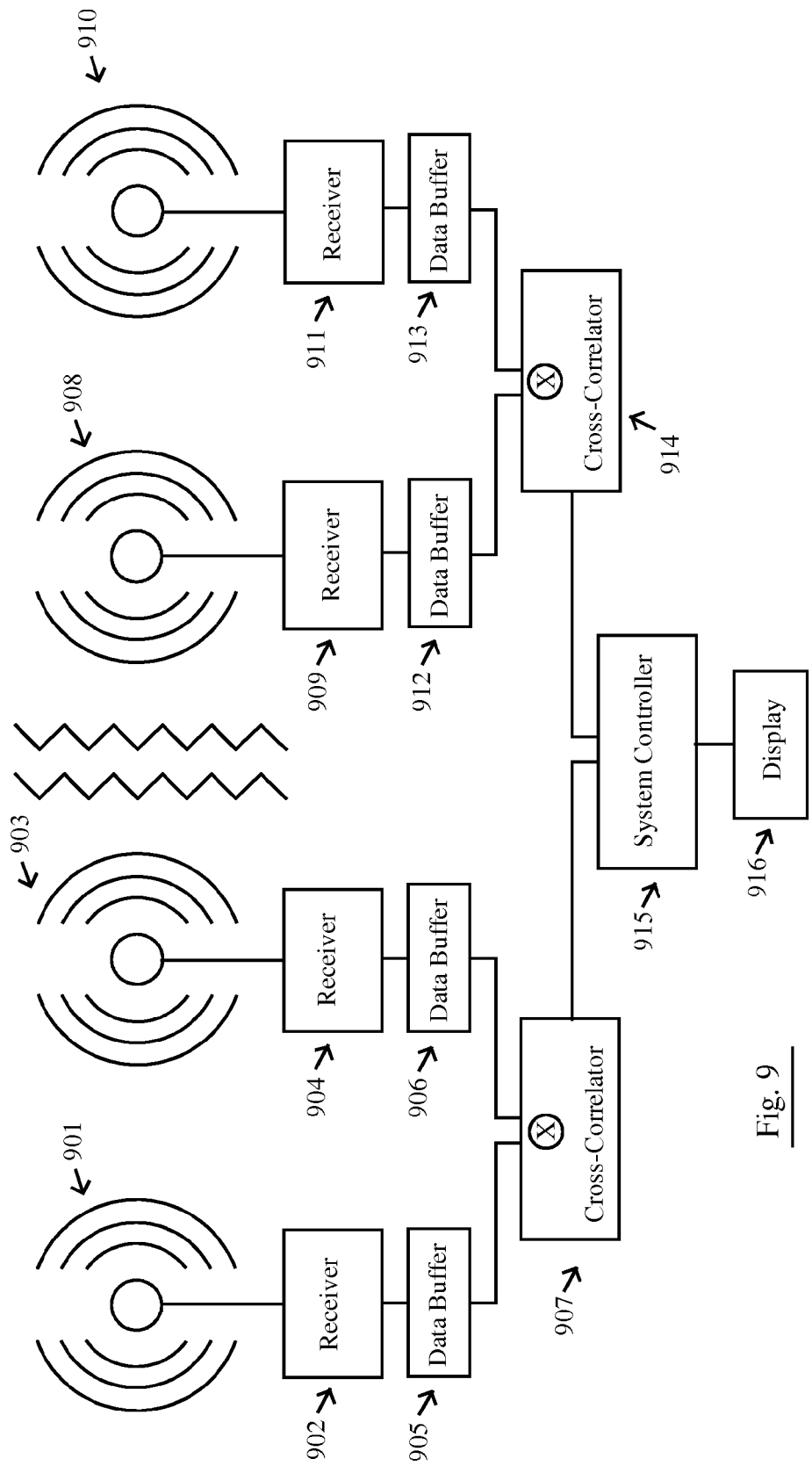
FIG. 9 is a general illustration showing a method for detecting spread spectrum radar, using two pairs of spatially separated omni-directional antennas.

FIG. 9 is a general illustration showing a method for detecting spread spectrum radar, using two pairs of receiving systems where the omni-directional antennas used in each receiving system are spatially separated and the two pairs of receiving systems are spatially separated from each other.

In the first pair of the receiving systems Omni-Directional Antenna 901 and Receiver 902 produce a first signal. The output of Receiver 902 is stored in Data Buffer 905. Omni-Directional Antenna 903 and Receiver 904 produce a second signal. The output of Receiver 904 is stored in Data Buffer 906. The data in Data Buffer 905 and Data Buffer 906 are used by Cross-Correlator 907 which performs a cross-correlation of the signals produced by Receiver 902 and Receiver 904. The noise produced by each receiver system is completely independent of each other so the internally generated noise is uncorrelated. If there is a correlation between the data frames from the two receiver systems it can only have come from an external source, such as a spread spectrum signal. The phase term (time delay) in the cross-correlation function is used to determine a first bearing to the target.

In the second pair of the receiving systems Omni-Directional Antenna 908 and Receiver 909 produce a third signal. Omni-Directional Antenna 910 and Receiver 911 produce a fourth signal. The output of Receiver 909 is stored in Data Buffer 912. The output of Receiver 911 is stored in Data Buffer 913. The data in Data Buffer 912 and Data Buffer 913 are used by Cross-Correlator 914 which performs a cross-correlation of the signals produced by Receiver 909 and Receiver 911. The noise produced by each receiver system is completely independent of each other so the internally generated noise is uncorrelated. If there is a correlation between the data frames from the two receiver systems it can only have come from an external source, such as a spread spectrum signal. The phase term (time delay) in the cross-correlation function is used to determine a second bearing to the target.

System Controller 915 controls the operation of Cross-Correlator 907 and Cross-Correlator 914. It may also control the operation of Receivers 902, 904, 909, and 911.

The distance between the first pair of receiving systems and the second pair of receiving systems is known. The first bearing to the target is determined using the first pair of receiving systems. The second bearing to the target is determined using the second pair of receiving systems. The distance and range to the target are determined using triangulation. The results are displayed on Display 916.

Figure 10:
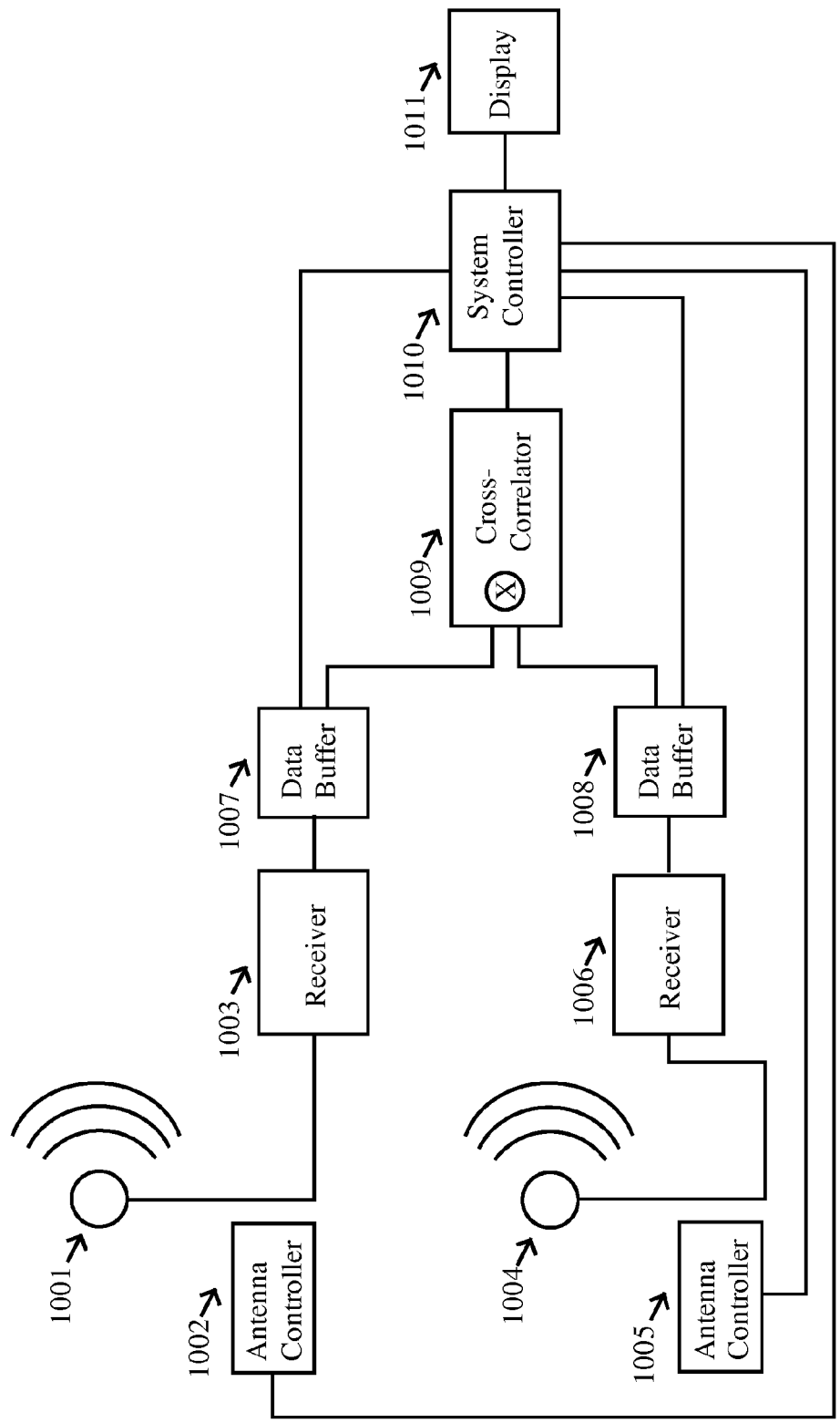
FIG. 10 is a general illustration showing a method for detecting spread spectrum radar, using two co-located directional antennas.

FIG. 10 is a general illustration showing a method for detecting spread spectrum radar using two co-located directional antennas. Directional Antenna 1001 and Receiver 1003 make up the first receiving system. The direction of Directional Antenna 1001 is controlled by Antenna Controller 1002. Directional Antenna 1004 and Receiver 1006 make up the second receiving system. The direction of Directional Antenna 1004 is controlled by Antenna Controller 1005. The data output of Receiver 1003 is stored in Data Buffer 1007. The output of Receiver 1006 is stored in Data Buffer 1008. The data in Data Buffer 1007 and Data Buffer 1008 are used by Cross-Correlator 1009 under control of System Controller 1010 which also controls Antenna Controller 1002 and Antenna Controller 1005.

The noise produced by each receiver system is completely independent of each other so the internally generated noise is uncorrelated. If there is a correlation between the data frames from two receiver systems it can only have come from an external source, such as a spread spectrum signal.

Because directional antennas are used, the phase term (time delay) in the cross-correlation function cannot be used to determine the bearing to the target. Directional Antenna 1001 and Directional Antenna 1004 are controlled so they always point in the same direction. The bearing to the target is determined from the direction the antennas are pointing.

Directional Antenna 1001 and Antenna Controller 1002 may be a system that mechanically aims Directional Antenna 1001 or the combination may be an electronically scanned array.

Likewise, Directional Antenna 1004 and Antenna Controller 1005 may be a system that mechanically aims Directional Antenna 1004 or the combination may be an electronically scanned array.

The results are displayed on Display 1011.

Figure 11:
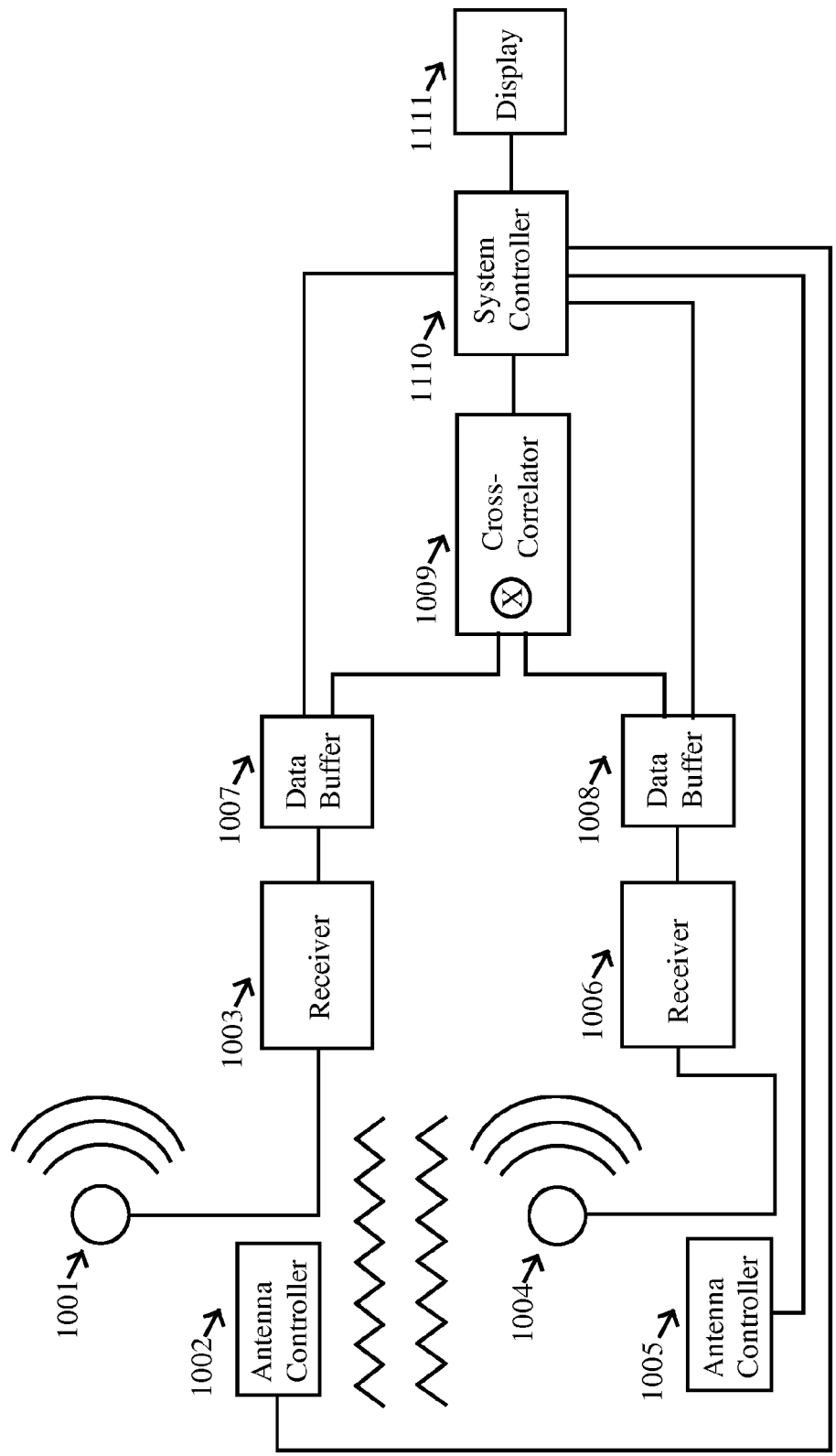
FIG. 11 is a general illustration showing a method for detecting spread spectrum radar and determining its range and bearing, using two spatially separated directional antennas.

FIG. 11 is a general illustration showing a method for detecting spread spectrum radar and determining its range and bearing using two spatially separated directional antennas. Directional Antenna 1001 and Receiver 1003 make up the first receiving system. The direction of Directional Antenna 1001 is controlled by Antenna Controller 1002. Directional Antenna 1004 and Receiver 1006 make up the second receiving system. The direction of Directional Antenna 1004 is controlled by Antenna Controller 1005. The output of Receiver 1003 is stored in Data Buffer 1007. The output of Receiver 1006 is stored in Data Buffer 1008. The data in Data Buffer 1007 and Data Buffer 1008 are used by Cross-Correlator 1009 under control of System Controller 1110 which also controls Antenna Controller 1002 and Antenna Controller 1005.

The noise produced by each receiver system is completely independent of each other so the internally generated noise is uncorrelated. If there is a correlation between the data frames from two receiver systems it can only have come from an external source, such as a spread spectrum signal.

Because directional antennas are used, the phase term (time delay) in the cross-correlation function cannot be used to determine the bearing to the target. Directional Antenna 1001 and Directional Antenna 1004 are spatially separate from each other. When a source of correlated noise is found the bearing of Directional Antenna 1001 and the bearing of Directional Antenna 1004 are used, along with the distance between, to triangulate the position and bearing to the external source of correlated noise, namely the target.

Directional Antenna 1001 and Antenna Controller 1002 may be a system that mechanically aims Directional Antenna 1001 or the combination may be an electronically scanned array. Likewise, Directional Antenna 1004 and Antenna Controller 1005 may be a system that mechanically aims Directional Antenna 1004 or the combination may be an electronically scanned array.

The results are displayed on Display 1111.

Figure 12:
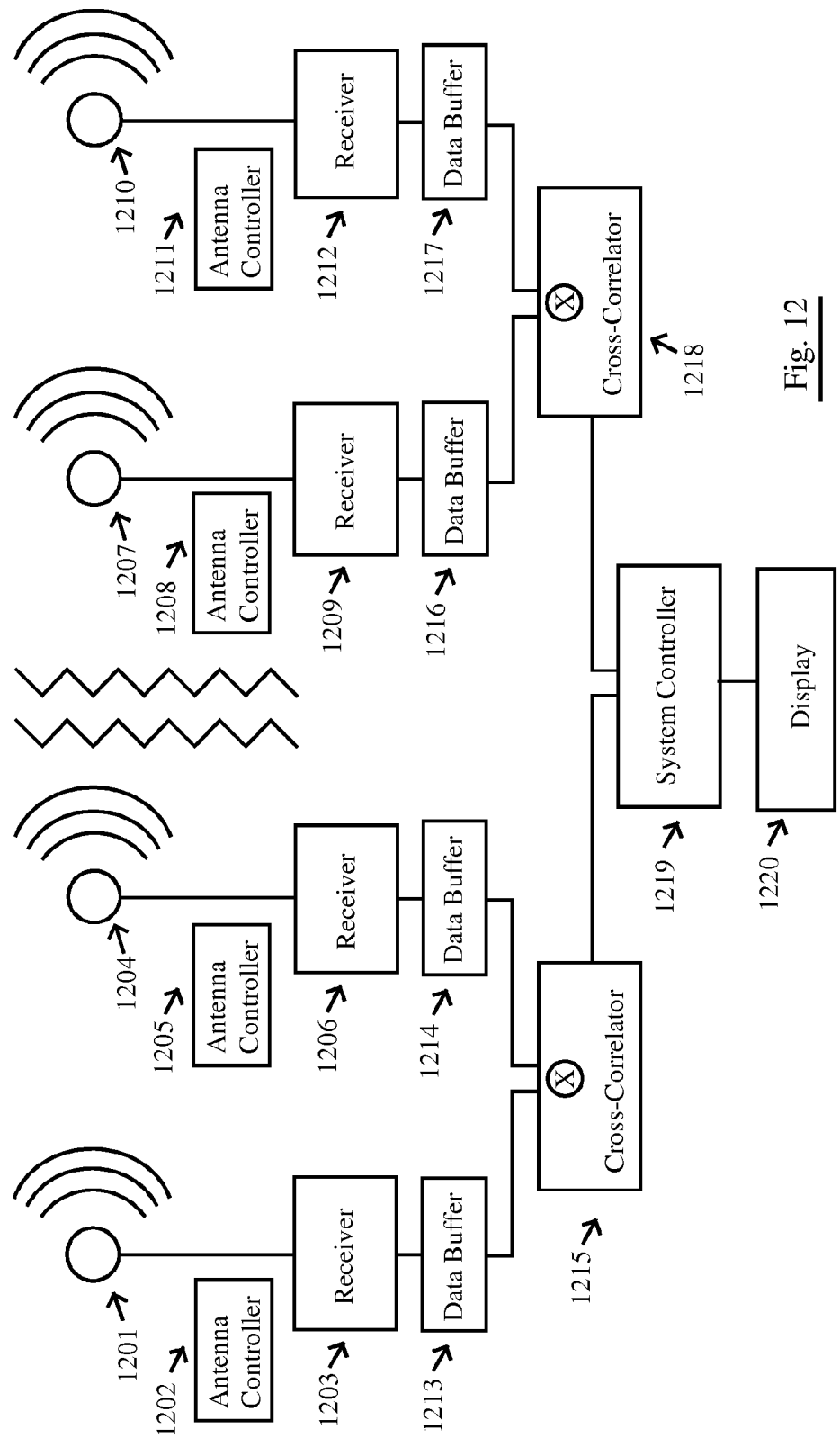
FIG. 12 is a general illustration showing a method for detecting spread spectrum radar and determining its range and bearing, using two spatially separated pairs of co-located directional antennas.

FIG. 12 is a general illustration showing a method for detecting spread spectrum radar and determining its range and bearing, using two spatially separated pairs of co-located directional antennas.

The first pair of co-located directional antennas are Directional Antenna 1201 and Directional Antenna 1204. Directional Antenna 1201 and Receiver 1203 make up the first receiving system of the pair. The output of Receiver 1203 is stored in Data Buffer 1213. The direction of Directional Antenna 1201 is controlled by Antenna Controller 1202. Directional Antenna 1204 and Receiver 1206 make up the second receiving system of the pair. The output of Receiver 1206 is stored in Data Buffer 1214. The direction of Directional Antenna 1204 is controlled by Antenna Controller 1205. The data in Data Buffer 1213 and Data Buffer 1214 are used by Cross-Correlator 1215 under control of System Controller 1219 which also controls Antenna Controller 1202 and Antenna Controller 1205.

The noise produced by each receiver system is completely independent of each other so the internally generated noise is uncorrelated. If there is a correlation between the data frames from two receiver systems it can only have come from an external source, such as a spread spectrum signal.

Because directional antennas are used, the phase term (time delay) in the cross-correlation function cannot be used to determine the bearing to the target. Directional Antenna 1201 and Directional Antenna 1204 are controlled so they always point in the same direction. The first bearing to the target is determined from the direction the antennas are pointing.

The second pair of co-located directional antennas are Directional Antenna 1207 and Directional Antenna 1210. Directional Antenna 1207 and Receiver 1209 make up the first receiving system of the pair. The output of Receiver 1209 is stored in Data Buffer 1216. The direction of Directional Antenna 1207 is controlled by Antenna Controller 1208. Directional Antenna 1210 and Receiver 1212 make up the second receiving system of the pair. The output of Receiver 1212 is stored in Data Buffer 1217. The direction of Directional Antenna 1210 is controlled by Antenna Controller 1211. The data in Data Buffer 1216 and Data Buffer 1217 are used by Cross-Correlator 1218 under control of System Controller 1219 which also controls Antenna Controller 1208 and Antenna Controller 1211. The noise produced by each receiver system is completely independent of each other so the internally generated noise is uncorrelated. If there is a correlation between the data frames from two receiver systems it can only have come from an external source, such as a spread spectrum signal.

Because directional antennas are used, the phase term (time delay) in the cross-correlation function cannot be used to determine the bearing to the target. Directional Antenna 1207 and Directional Antenna 1210 are controlled so they always point in the same direction. The second bearing to the target is determined from the direction the antennas are pointing.

When a source of correlated noise is found by the first pair of co-located directional antennas the second pair of co-located directional antennas is brought to bear until it also finds the target. The first bearing to the target and the second bearing to the target, along with the distance between the first pair of co-located directional antennas and the second pair of co-located directional antennas, is used to triangulate the position and bearing to the external source of correlated noise, namely the target.

Conversely, when a source of correlated noise is found by the second pair of co-located directional antennas the first pair of co-located directional antennas is brought to bear until it also finds the target. The first bearing to the target and the second bearing to the target, along with the distance between the first pair of co-located directional antennas and the second pair of co-located directional antennas, is used to triangulate the position and bearing to the external source of correlated noise, namely the target.

Directional Antenna 1201 and Antenna Controller 1202 may be a system that mechanically aims Directional Antenna 1201 or the combination may be an electronically scanned array. Directional Antenna 1204 and Antenna Controller 1205 may be a system that mechanically aims Directional Antenna 1204 or the combination may be an electronically scanned array. Directional Antenna 1207 and Antenna Controller 1208 may be a system that mechanically aims Directional Antenna 1207 or the combination may be an electronically scanned array. Directional Antenna 1210 and Antenna Controller 1211 may be a system that mechanically aims Directional Antenna 1210 or the combination may be an electronically scanned array.

The results are displayed on Display 1220.

Figure 13:
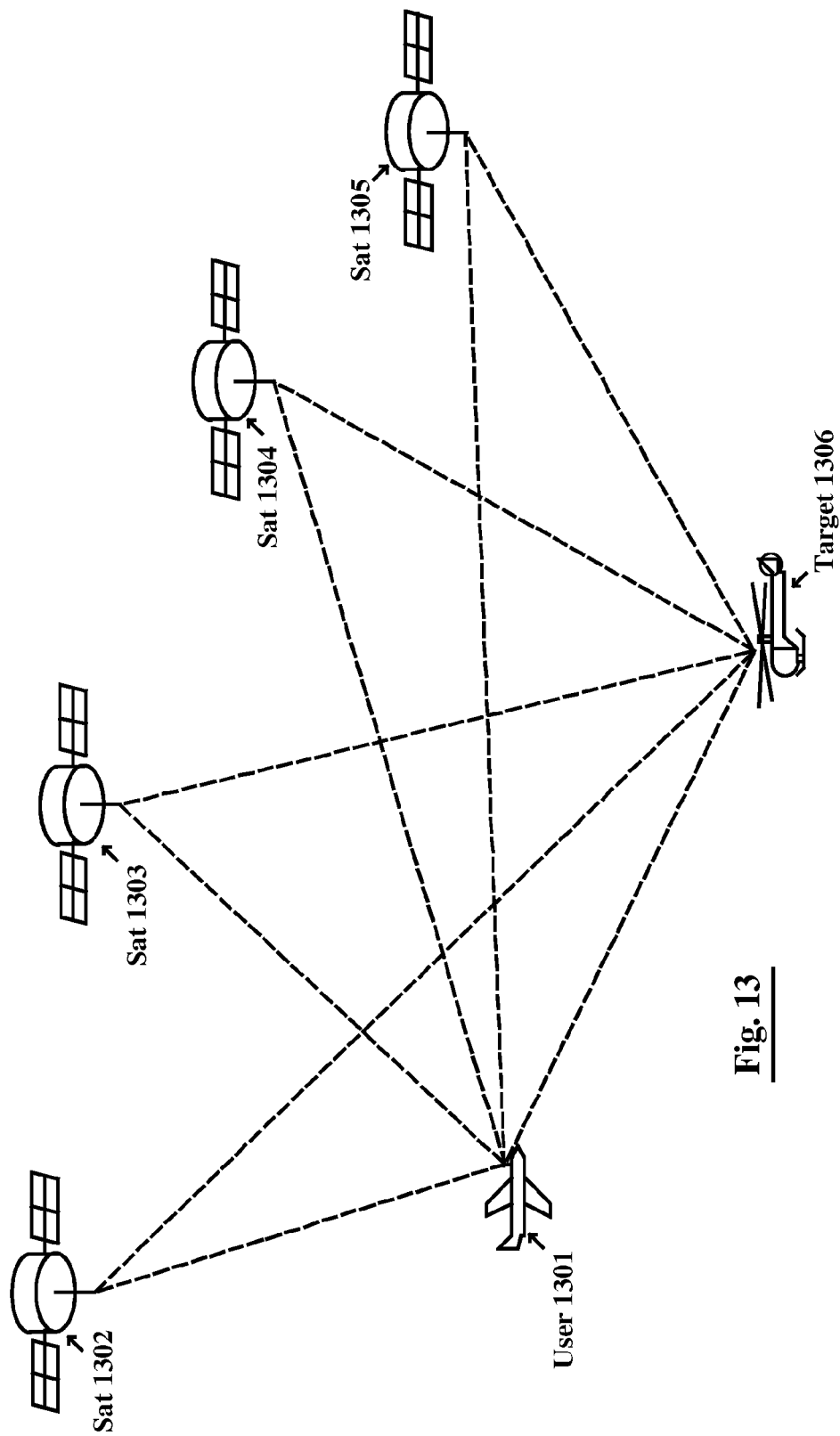
FIG. 13 is a general illustration showing a spread spectrum bistatic radar using a satellite constellation as the radar transmitters.

FIG. 13 is a general illustration showing a spread spectrum bistatic radar using a satellite constellation as the radar transmitters. Satellites 1302, 1303, 1304, and 1305 transmit a spread spectrum signal, each having a unique code key. The signal from each satellite is received in a direct path by User 1301. The signal from each satellite is also reflected by Target 1306 and received by User 1301. User 1301 determines his own position and the positions of Satellites 1302, 1303, 1304, and 1305. User 1301 determines the length of the direct path to the satellites and the total length of the signal path from each satellite reflected by Target 1306. By performing the appropriate mathematical calculations User 1301 determines the absolute position of Target 1306.

Alternatively, User 1301 determines the positions of Satellites 1302, 1303, 1304, and 1305 relative to himself. User 1301 determines the length of the direct path to the satellites and the total length of each signal path from each satellite reflected by Target 1306. By using the appropriate mathematical calculations User 1301 determines the relative position of Target 1306.

FIG. 14 is a general illustration showing the User equipment suitable for use by spread spectrum radar using a satellite constellation as the radar transmitters. Omni-Directional Antenna 1401 receives the signals transmitted directly from Satellites 1302, 1303, 1304, and 1305 (FIG. 13) as well as the satellite signals reflected by Target 1306 (also FIG. 13). Omni-Directional Antenna 1401 sends these signals to Receiver 1402. The output of Receiver 1402 is stored in Data Buffer 1403. Under the control of System Controller 1406, Correlator 1404 performs correlations between the data stored in Data Buffer 1403 and a List of Code Keys 1405 which correspond to the Code Keys used by the satellites in the satellite constellation. System Controller 1406 also determines the length of the direct path from each satellite, the length of the path from each satellite reflected by Target 1306 (FIG. 13) and performs the calculations to determine the range and bearing to Target 1306. The results are displayed on Display 1407.

FIG. 15 is a general illustration showing another form of User equipment suitable for use by spread spectrum radar using a satellite constellation as the radar transmitters. Omni-Directional Antenna 1401 receives the signals transmitted directly from Satellites 1302, 1303, 1304, and 1305 (FIG. 13) as well as the satellite signals reflected by Target 1306 (also FIG. 13). Omni-Directional Antenna 1401 sends these signals to Receiver 1402. The output of Receiver 1402 is stored in Data Buffer 1403. Under the control of System Controller 1506, Correlator 1404 performs correlations between the data stored in Data Buffer 1403 and a List of Code Keys 1405 which correspond to the Code Keys used by the satellites in the satellite constellation. System Controller 1506 uses GPS Receiver 1507 to determine the User's position. System Controller 1506 also determines the length of the direct path from each satellite, the length of the path from each satellite reflected by Target 1306 (FIG. 13) and performs the calculations to determine the range and bearing to Target 1306. The results are displayed on Display 1508.

Figure 16:
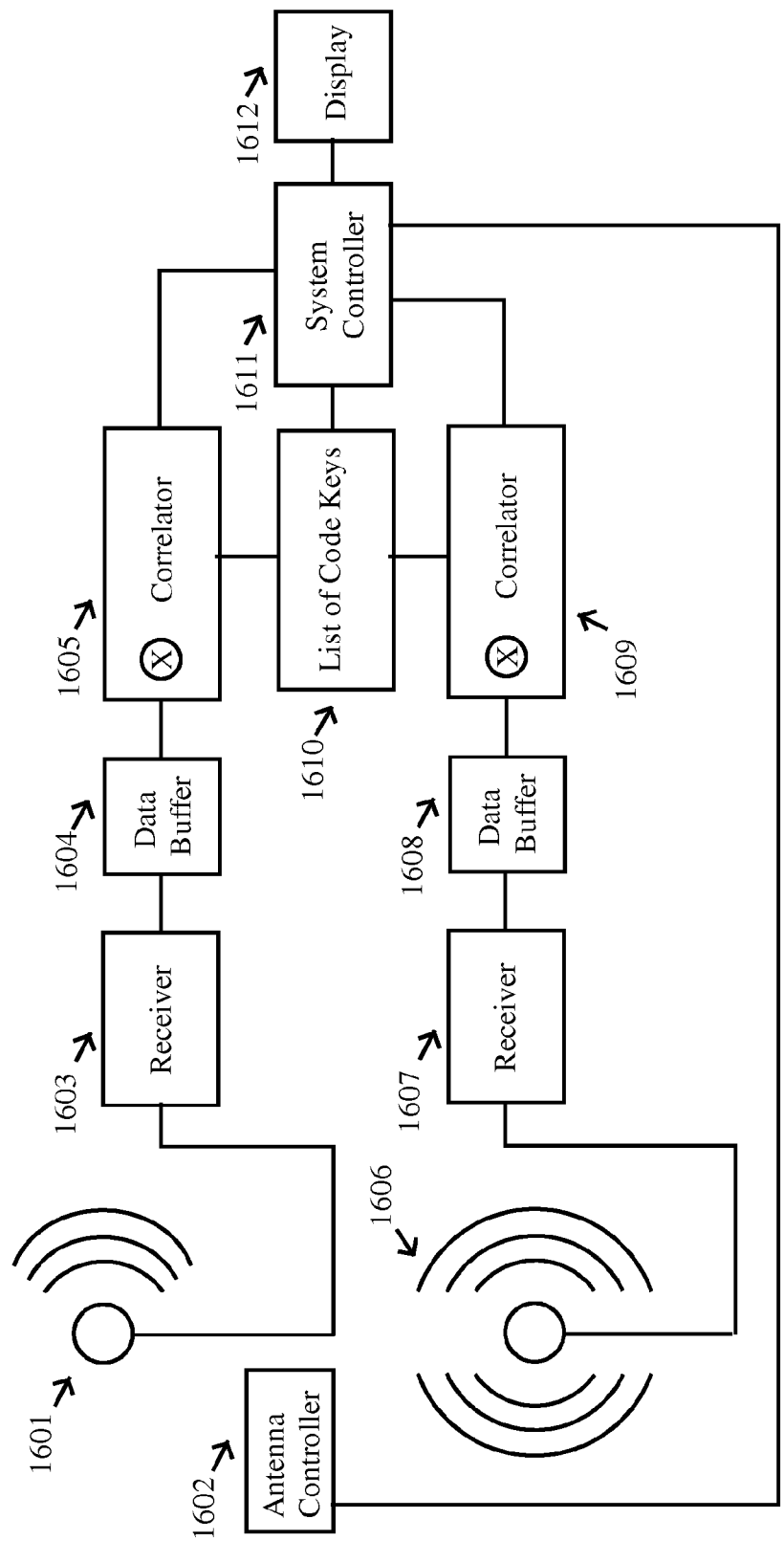
FIG. 16 is a general illustration showing the User equipment suitable for use in a spread spectrum radar system using a satellite constellation as the radar transmitters, a directional receive antenna, and an omni-directional receive antenna.

FIG. 16 is a general illustration showing the User equipment suitable for use by spread spectrum radar using a satellite constellation as the radar transmitters. Directional Antenna 1601 receives the signals reflected by Target 1306 (FIG. 13) from Satellites 1302, 1303, 1304, and 1305 (FIG. 13). Directional Antenna 1601 sends these signals to Receiver 1603. The output of Receiver 1603 is stored in Data Buffer 1604. Under the control of System Controller 1611, Correlator 1605 performs correlations between the data stored in Data Buffer 1604 and a list of Code Keys 1610 which correspond to the Code Keys used by the satellites in the satellite constellation. System Controller 1611 also controls the direction of Directional Antenna 1601 using Antenna Controller 1602.

Omni-Directional Antenna 1606 receives the signals directly sent by Satellites 1302, 1303, 1304, and 1305 (FIG. 13). Omni-Directional Antenna 1606 sends these signals to Receiver 1607. The output of Receiver 1607 is stored in Data Buffer 1608. Under the control of System Controller 1611, Correlator 1609 performs correlations between the data stored in Data Buffer 1608 and a List of Code Keys 1610 which correspond to the Code Keys used by the satellites in the satellite constellation. System Controller 1611 also determines the length of the direct path from each satellite and performs the calculations to determine the range and bearing to Target 1306.

Directional Antenna 1601 and Antenna Controller 1602 may be a system that mechanically aims Directional Antenna 1601 or the combination may be an electronically scanned array. The results are displayed on Display 1612.

Figure 17:
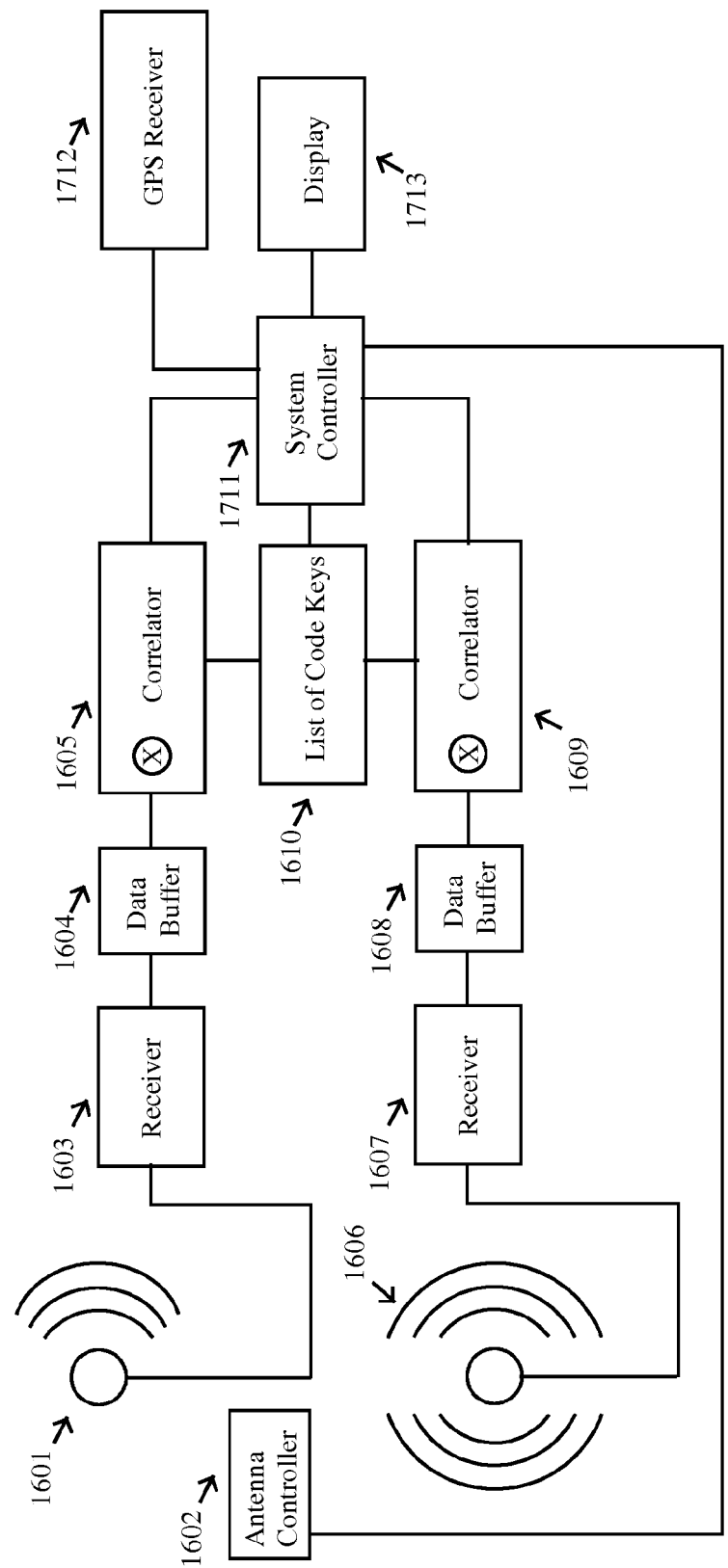
FIG. 17 is a general illustration showing another form of User equipment suitable for use in a spread spectrum radar system using a satellite constellation as the radar transmitters, a directional receive antenna, and an omni-directional receive antenna.

FIG. 17 is a general illustration showing another form of User equipment suitable for use by spread spectrum radar using a satellite constellation as the radar transmitters. Directional Antenna 1601 receives the signals reflected by Target 1306 (FIG. 13) from Satellites 1302, 1303, 1304, and 1305 (FIG. 13). Directional Antenna 1601 sends these signals to Receiver 1603. The output of Receiver 1603 is stored in Data Buffer 1604. Under the control of System Controller 1711, Correlator 1605 performs correlations between the data stored in Data Buffer 1604 and a List of Code Keys 1610 which correspond to the Code Keys used by the satellites in the satellite constellation. System Controller 1711 also controls the direction of Directional Antenna 1601 using Antenna Controller 1602.

Omni-Directional Antenna 1606 receives the signals directly sent by Satellites 1302, 1303, 1304, and 1305 (FIG. 13). Omni-Directional Antenna 1606 sends these signals to Receiver 1607. The output of Receiver 1607 is stored in Data Buffer 1608. Under the control of System Controller 1711, Correlator 1609 performs correlations between the data stored in Data Buffer 1608 and a List of Code Keys 1610 which correspond to the Code Keys used by the satellites in the satellite constellation. System Controller 1711 also uses GPS Receiver 1712 to determine the length of the direct path from each satellite and performs the calculations to determine the range and bearing to Target 1306.

Directional Antenna 1601 and Antenna Controller 1602 may be a system that mechanically aims Directional Antenna 1601 or the combination may be an electronically scanned array. The results are displayed on Display 1713.

Figure 18:
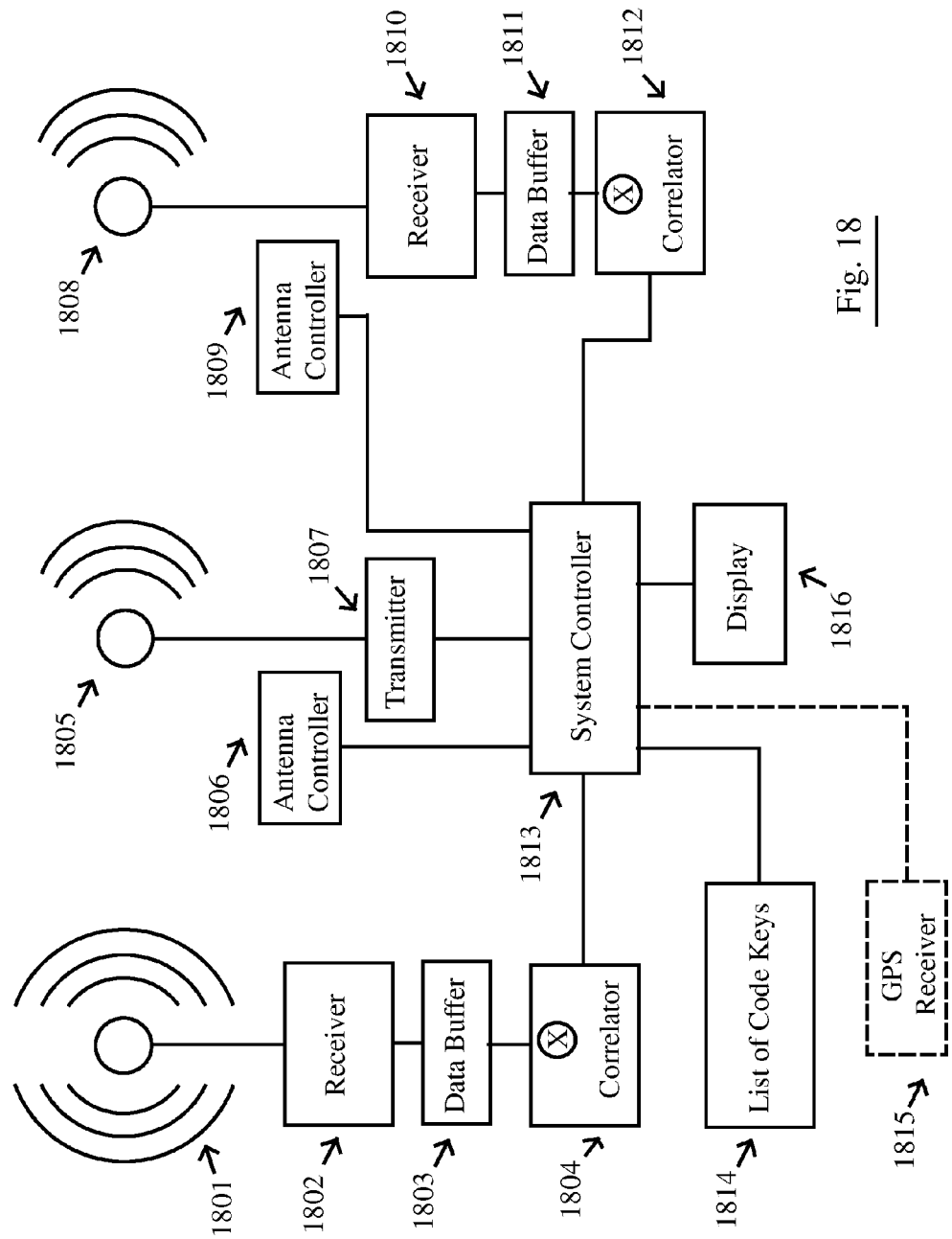
FIG. 18 is a general illustration showing an integrated bistatic spread spectrum radar system using a satellite constellation for the radar function as well as for communications.

FIG. 18 is a general illustration showing an integrated bistatic spread spectrum radar system using a satellite constellation as the radar as well as for communications. Omni-Directional Antenna 1801 receives the signals transmitted directly from Satellites 1302, 1303, 1304, and 1305 (FIG. 13) which contain the communications signals which are also used for bistatic radar. The signals from Omni-Directional Antenna 1801 are sent to Receiver 1802. The output of Receiver 1802 is stored in Data Buffer 1803. Under the control of System Controller 1813, Correlator 1804 performs correlations between the data stored in Data Buffer 1803 and the List of Code Keys 1814 used by the satellites in the satellite constellation shown in FIG. 13.

System Controller 1813 uses List of Code Keys 1814 to create a spread spectrum signal and transmits it to the satellites using Transmitter 1807 and Directional Antenna 1805. System Controller 1813 controls the direction of Directional Antenna 1805 using Antenna Controller 1806.

Directional Antenna 1808 is used to receive the satellite signals reflected by Target 1306 (FIG. 13). Directional Antenna 1808 sends these signals to Receiver 1810. The output of Receiver 1810 is stored in Data Buffer 1811. Under the control of System Controller 1813, Correlator 1812 performs correlations between the data stored in Data Buffer 1811 and a List of Code Keys 1814 which correspond to the Code Keys used by the satellites in the satellite constellation. System Controller 1813 determines the length of the direct path from each satellite, the length of the path from each satellite reflected by Target 1306 (FIG. 13) and performs the calculations to determine the range and bearing to Target 1306. The use of GPS Receiver 1815 in determining the User's position is optional. System Controller 1813 controls the direction of Directional Antenna 1808 using Antenna Controller 1809.

Directional Antenna 1805 and Antenna Controller 1806 may be a system that mechanically aims Directional Antenna 1805 or the combination may be an electronically scanned array. Directional Antenna 1808 and Antenna Controller 1809 may be a system that mechanically aims Directional Antenna 1808 or the combination may be an electronically scanned array. The results are displayed on Display 1816.

Geometry

The geometry of a bistatic radar will be discussed, starting with a 2D system which will then be expanded to a 3D system.

Referring to FIG. 19, Receiver 1901 receives a signal directly from Transmitter 1902 through Path L 1904. Receiver 1901 also receives a signal from Transmitter 1902 reflected off of Target 1903 through Path r1 1905 and Path r2 1906.

Receiver 1901 only knows the sum of Path r1 1905 and Path r2 1906. The locus of all points of a plane whose distances to two fixed points add to the same constant is an ellipse. As a result, as shown in FIG. 20, Receiver 1901 only knows that Target 1903 is somewhere on Ellipse 2007. Receiver 1901 and Transmitter 1902 are located at the two foci of Ellipse 2007.

In the following discussion, the labels are emboldened and omit the drawing figure numbers in order to avoid an unmanageable clutter.

Figure 21:
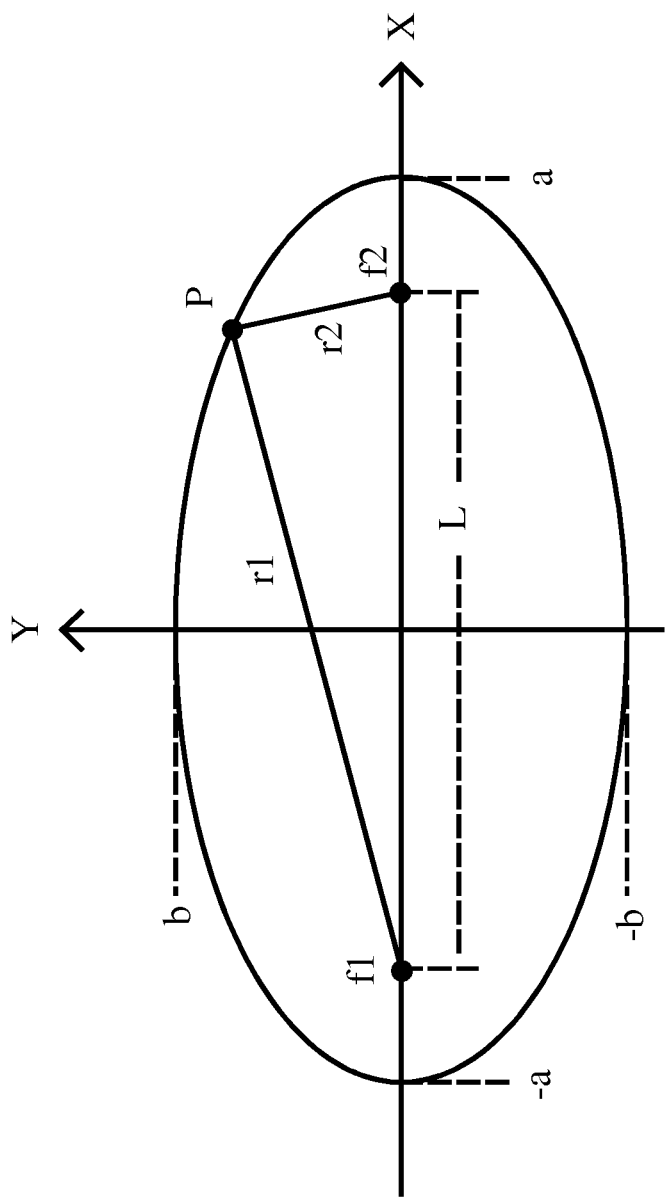
FIG. 21 is a general illustration showing the geometry of an ellipse.

FIG. 21 shows an ellipse in standard form. The foci are at f1 and f2. The semi-major axis is a. (The major axis is 2*a) The semi-minor axis is b. (The minor axis is 2*b)

The two foci are equidistant from the Y axis, and are separated by distance L.

The sum of r1 and r2 is constant so that Point P traces out the ellipse.

The parametric equation for an ellipse is:

$$\frac{x^2}{a^2} + \frac{y^2}{b^2} = 1$$

Note that if a=b:

$$\frac{x^2}{a^2} + \frac{y^2}{a^2} = 1$$

$$\frac{x^2 + y^2}{a^2} = 1$$

$$x^2 + y^2 = a^2$$

If we rename a and call it r, most engineers will recognize this as the parametric equation for a circle.

$$x^2 + y^2 = r^2$$

An ellipse is also a simple form of Lissajous Figure where:

$$x = R*\sin(2\pi t) \text{ and } y = R*\sin(2\pi t + \delta)$$

For more on Lissajous Figures see IDS Cite 27.

The ellipse data produced by the present system will be L and the sum of r1 and r2. L is the distance between the foci f1 and f2. Another way of putting it is that f1=−f2=L/2. We want to determine the semi-major axis (a) and the semi-minor axis (b).

Figure 22:
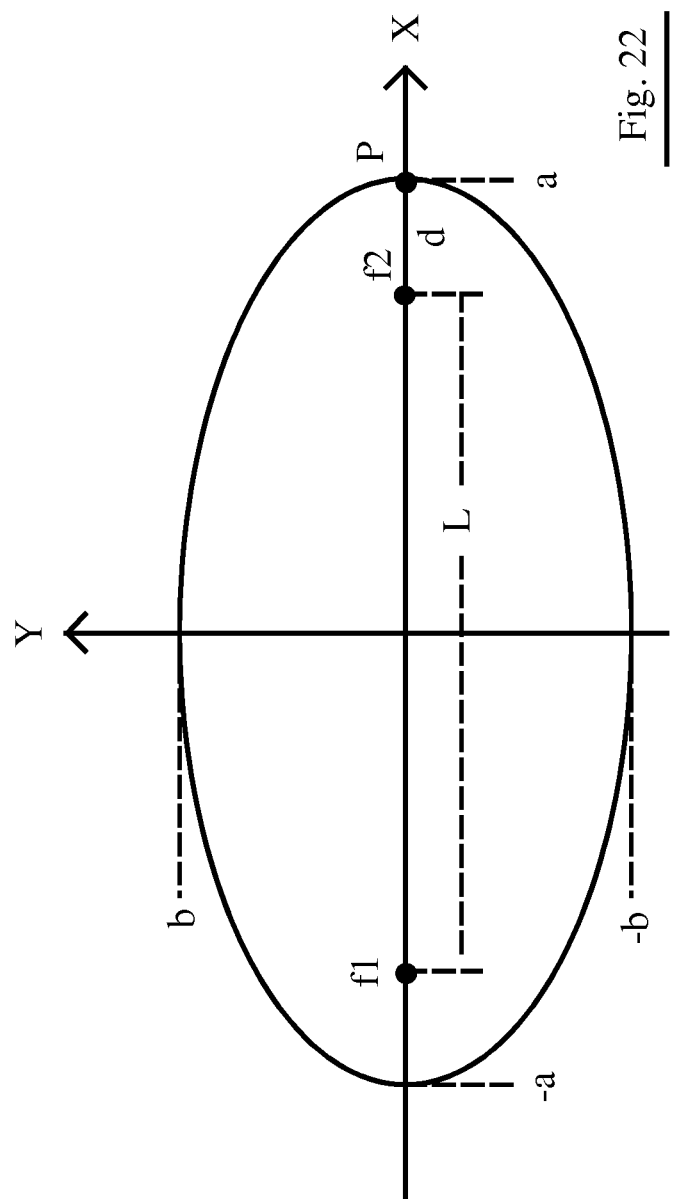
FIG. 22 is a general illustration further showing the geometry of an ellipse.

In FIG. 22, Point P has been moved to (a,0). r1 and r2 are not shown because they lie on the X axis.

The distance from f1 to (a,0) and from (a,0) to f2 is the sum of r1 and r2 because that is the definition of an ellipse.

The distance from f1 to f2 is L. The distance from f2 to (a,0) is d. The distance from (a,0) back to f2 is, again, d.

$$r1+r2 = L+d+d$$

$$2*d = r1+r2-L$$

$$d = (r1+r2-L)/2 = (r1+r2)/2 - L/2$$

Therefore:

$$a = L/2 + d$$
$$= L/2 + (r1+r2)/2 - L/2$$
$$= (r1+r2)/2$$

Figure 23:
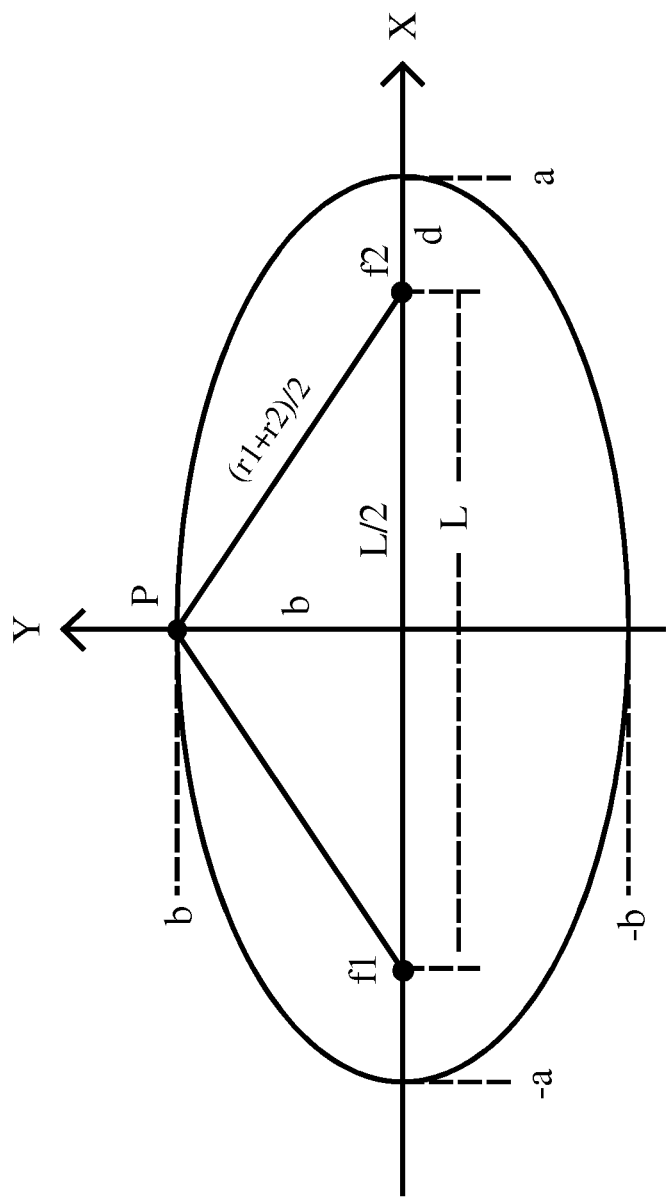
FIG. 23 is a general illustration further showing the geometry of an ellipse.

Now that we have found the semi-major axis a, let's find the semi-minor axis b. Referring to FIG. 23, when P is located at (0,b) the sum of r1+r2 is divided into two equal parts and forms two right triangles with the Origin (0,0) and the foci. Note that in this case r1=r2 and the line from P to each focal point is the same length as the semi-major axis (r1+r2)/2.

$$b^2 = \left(\frac{(r1+r2)}{2}\right)^2 - \left(\frac{L}{2}\right)^2$$

$$b = \sqrt{\left(\frac{(r1+r2)}{2}\right)^2 - \left(\frac{L}{2}\right)^2}$$

Therefore, since the present system measures (r1+r2) and measures (or calculates) L we can calculate a and b and with that we can calculate any point on the ellipse.

$$\frac{x^2}{a^2} + \frac{y^2}{b^2} = 1$$

where:

$$a = (r1+r2)/2$$

$$b = \sqrt{\left(\frac{(r1+r2)}{2}\right)^2 - \left(\frac{L}{2}\right)^2}$$

The general ellipsoid, also called a triaxial ellipsoid, is a quadratic surface which is given in Cartesian coordinates by the parametric equation:

$$\frac{x^2}{a^2} + \frac{y^2}{b^2} + \frac{z^2}{c^2} = 1$$

Note that if a=b=c:

$$\frac{x^2}{a^2} + \frac{y^2}{a^2} + \frac{z^2}{a^2} = 1$$

$$\frac{x^2 + y^2 + z^2}{a^2} = 1$$

$$x^2 + y^2 + z^2 = a^2$$

If we rename a and call it r, most engineers will recognize this as the parametric equation for a sphere.

$$x^2 + y^2 + z^2 = r^2$$

In the current ellipsoid:

$$\frac{x^2}{a^2} + \frac{y^2}{b^2} + \frac{z^2}{c^2} = 1$$

c=b because the target is on the radius of a circle around the axis formed by the two foci. To be precise, this makes our ellipsoid a spheroid and since it is likely that the target will be much closer than any of the satellites a will be larger than b, making it a prolate spheroid. In the current ellipsoid:

$$\frac{x^2}{a^2} + \frac{y^2}{b^2} + \frac{z^2}{b^2} = 1$$

$$\frac{x^2}{a^2} + \frac{y^2 + z^2}{b^2} = 1$$

Figure 31:
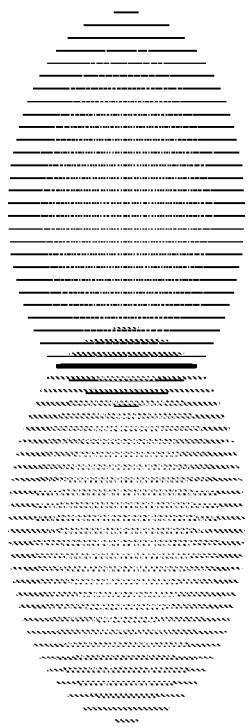
FIG. 31 is a general illustration also showing two ellipsoids with a common focus, meeting end-to-end.
Figure 33:
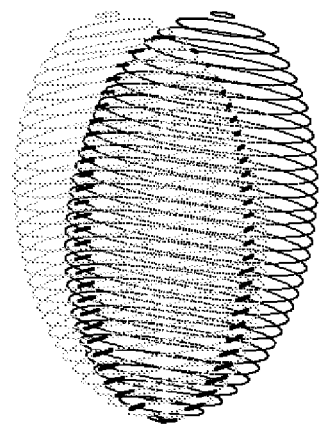
FIG. 33 is a general illustration of two ellipsoids with a common focus, meeting at a second arbitrary angle.
Figure 32:
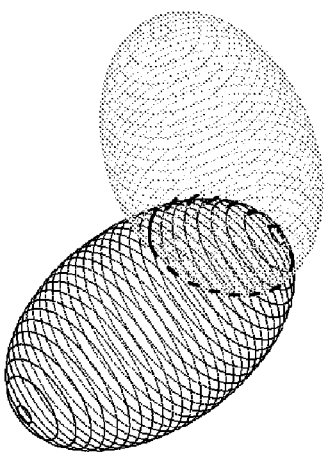
FIG. 32 is a general illustration of two ellipsoids with a common focus, meeting at a first arbitrary angle.

When two ellipsoids having a common focus intersect they produce an ellipse. FIG. 31 is a general illustration showing two ellipsoids with a common focus, meeting end-to-end, producing a circle seen edge-on. FIG. 31, FIG. 32, and FIG. 33 were produced by a computer program that modeled an ellipsoid as a segmented prolate spheroid, i.e. a number of circles around a major axis. The radii of the circles vary according to the curve of an ellipse. Projection is orthonormal. In FIG. 32 the two ellipsoids are meeting at a first arbitrary angle. In FIG. 33 the two ellipsoids meet at a second arbitrary angle. By inspection it appears that the smaller the angle between the ellipsoids the larger the intersection ellipse. The implication of this is that the closer together the satellites are, the larger the ellipse of intersection becomes. As the satellites become farther apart, the ellipse of intersection becomes smaller.

Figure 24:
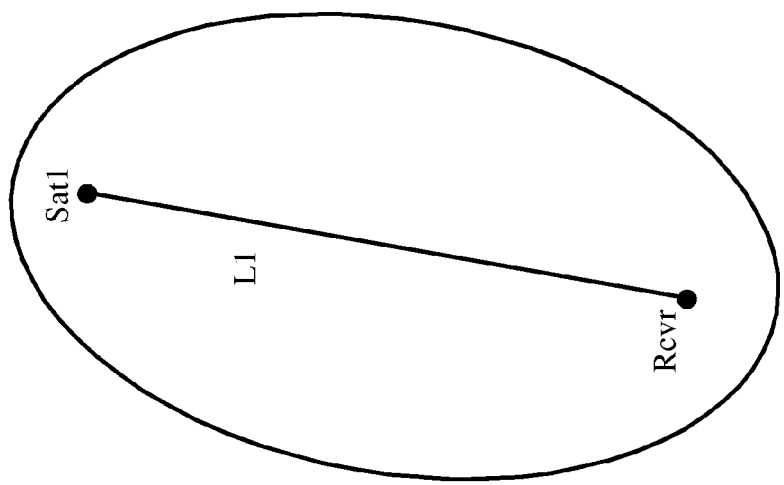
FIG. 24 is a general illustration showing a receiver and a first satellite at the foci of a first ellipse.

Starting with the first satellite in FIG. 13 (but in 2D) the User knows the total length of the path from a first satellite to the target and then to the User and wants to know the length of the path from the target to himself. The User also knows the length of the path from the first satellite to himself. Mathematically, this is the definition of an ellipse. The User and the first satellite are at the foci and the target is somewhere on the ellipse. See FIG. 24.

Figure 25:
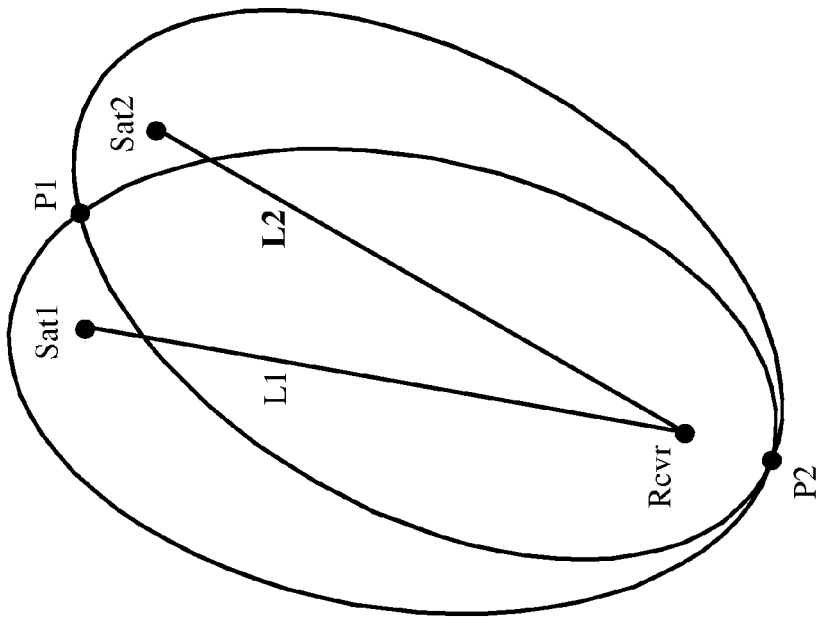
FIG. 25 is a general illustration showing a receiver and a first satellite at the foci of a first ellipse and the receiver and a second satellite at the foci of a second ellipse.

When a second satellite is added, a second ellipse is formed. The User is at one of the foci, the second satellite is at the other. The first ellipse and the second ellipse intersect at only two points, with the target at one of the two points. See FIG. 25.

Figure 26:
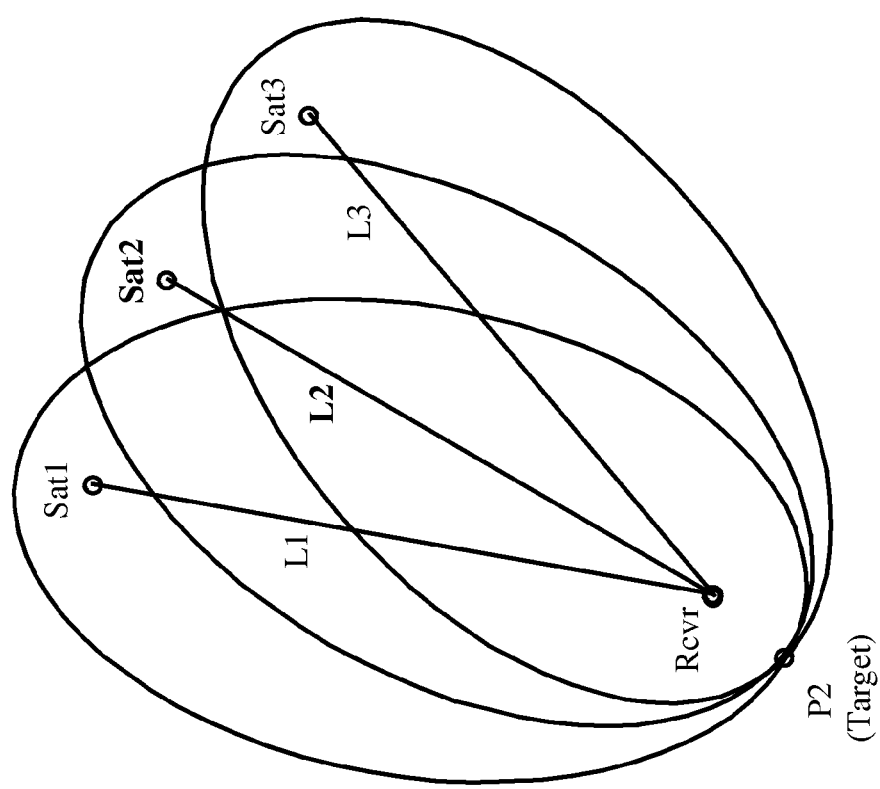
FIG. 26 is a general illustration showing a receiver and a first satellite at the foci of a first ellipse, the receiver and a second satellite at the foci of a second ellipse, and the receiver and a third satellite at the foci of a third ellipse.

When a third satellite is added, a third ellipse is formed. Again, the User is at one of the foci and the third satellite is at the other. The three ellipses intersect at only one point. That is where the target is. See FIG. 26.

There is something to note. Not all ellipses that share a focus point will intersect. See FIG. 27. However, in the present case they must intersect because the ellipses were created by reflections from the same target, and the target cannot be in more than one place at the same time. It is possible that two ellipses that share a focus point will intersect at only one point, but that is a special case. See FIG. 28.

Figure 29:
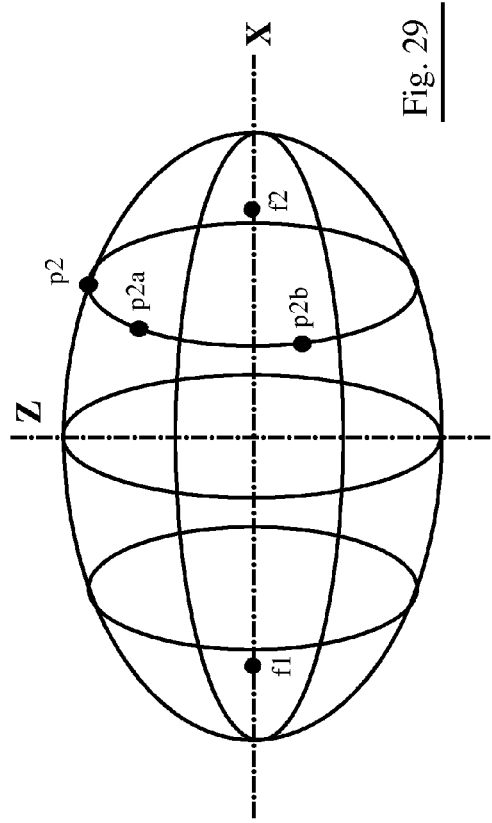
FIG. 29 is a general illustration showing an ellipsoid.
Figure 30:
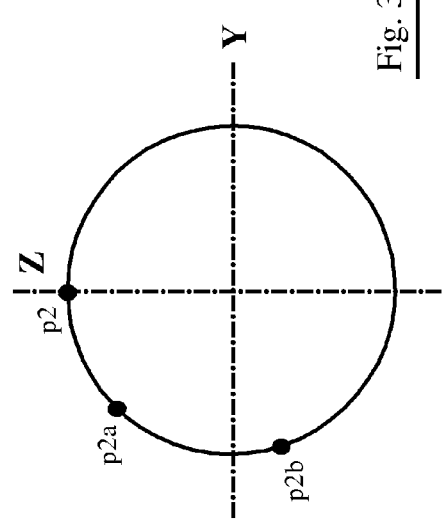
FIG. 30 is a general illustration showing a cross section of the longitudinal axis of the ellipsoid shown in FIG. 29.

A 3D system is more complicated because the geometric figure produced between each satellite and the User is not a 2D planar ellipse. Picture an ellipse rotating around the axis between the User and the satellite. The figure that each Satellite produces is an ellipsoid, more specifically, a prolate spheroid, that looks remarkably like a football (U.S. or Canadian). See FIG. 29. That is because a line from the target meets the line from the User to the satellite at a 90 degree angle and forms the radius of a circle. See FIG. 30. The target can be anywhere on that circle which means it can be anywhere on the surface of the ellipsoid.

Referring to FIG. 13, Satellite 1302 produces an ellipsoid with the User at one foci and the satellite at the other. The target is somewhere on the surface of the ellipsoid.

When a second satellite (Satellite 1303) is added, a second ellipsoid is formed. The User is at one of the foci, the second satellite is at the other. The first ellipsoid and the second ellipsoid intersect and produce an ellipse. The reason the ellipsoids produce an ellipse is because they share a common focus. [IDS Cite 26]

When a third satellite (Satellite 1304) is added, a third ellipsoid is formed. The User is at one of the foci, the third satellite is at the other. The first and second ellipsoids and the third ellipsoid intersect with the target at one of two points.

When a fourth satellite (Satellite 1305) is added, a fourth ellipsoid is formed. The User is at one of the foci, the fourth satellite is at the other. The first three ellipsoids and the fourth ellipsoid intersect at only one point. That is where the target is.

The geometry that has been described might not be obvious to someone versed mainly in GPS geometry. GPS uses only three satellites to determine the User's position in three dimensions. (A fourth satellite is used for time correction.) The reason for this difference is because instead of using only the signal received directly from the satellite, the User is receiving both the direct signal and a signal reflected from the target. A line from the target meets the line from the User to the satellite at a 90 degree angle and forms the radius of a circle. The target can be anywhere on that circle. That is why the additional satellite is needed to determine the position of the target.

The geometry shows that several system configurations are possible.

1. System 0—It is not necessary to receive any signals directly from any satellites. Only the signals reflected from the target are needed. The User tries all of the code keys for all the satellites or uses an ephemeris to try only the codes for the satellites that are in view. A signal that is detected is subjected to the various treatments described in the previous section on detecting spread spectrum radar. It may be possible to use the radio frequency emanations from the Sun and not use any satellites, but only during daytime.
2. System 1—The direct and reflected signal from only one satellite is used. This detects the presence of the target but its position can be anywhere on an ellipsoid, which is better than nothing. A directional antenna is used to scan those areas corresponding to the surface of the ellipsoid.
3. System 2—The direct and reflected signals from two satellites are used. This detects the presence of the target and locates its position to the area of a planar ellipse. A directional antenna is used to scan those areas corresponding the surface of the ellipse.
4. System 3—The direct and reflected signals from three satellites are used. This detects the presence of the target and narrows its position down to only two positions. A directional antenna is used to determine which position the target is in.
5. System 4—The direct and reflected signals from four satellites are used to detect the presence and position of the target. Only a single omni-directional antenna is needed.

While preferred embodiments of the present invention have been shown, it is to be expressly understood that modifications and changes may be made thereto.

I claim:

1. A system for sensing aircraft and other objects comprising:
   (a) an Automatic Dependent Surveillance-Broadcast (ADS-B) transmitter;
   (b) an ADS-B receiver;
   (c) a first ADS-B antenna;
   (d) a second ADS-B antenna;
   (e) an antenna controller;
   (f) an ADS-B antenna multiplexer;
   (g) an ADS-B processor;
   (h) a radar processor;
   (i) a display;
   whereby
   (j) said second ADS-B antenna is directional and said radar processor is configured to control said antenna controller which is configured to control the direction of said second ADS-B antenna,
   (k) said ADS-B processor is configured to control said ADS-B antenna multiplexer, and said ADS-B antenna multiplexer is configured to allow said ADS-B transmitter to use either said first ADS-B antenna or said second ADS-B antenna, and said ADS-B antenna multiplexer is also configured to allow said ADS-B receiver to use either said first ADS-B antenna or said second ADS-B antenna,
   (l) said ADS-B processor and said radar processor are configured to work together,
   (m) said ADS-B processor is configured to periodically cause said ADS-B transmitter to emit a transmitted signal through either said first ADS-B antenna or said second ADS-B antenna through said ADS-B antenna multiplexer,
   (n) said transmitted signal is reflected by a target producing a reflected signal,
   (o) said reflected signal is received by either or both said first ADS-B antenna and said second ADS-B antenna, and said ADS-B antenna multiplexer is configured to select either said first ADS-B antenna or said second ADS-B antenna and send said reflected signal to said ADS-B receiver,
   (p) said radar processor is configured to process said reflected signal from said ADS-B receiver and said transmitted signal from said ADS-B transmitter to determine a range to said target,
   (q) said radar processor is configured to use the direction of said second ADS-B antenna to determine a bearing to said target, and
   (r) said radar processor is configured to display said range and said bearing on said display.

2. The system of claim 1 whereby
   (a) if said range and said bearing to said target do not match the position of said target as reported by ADS-B messages from said target said radar processor is configured to note this on said display as a first attention item,
   (b) said radar processor is configured to use the change in the positions of said target as reported by said ADS-B messages received from said target to calculate a reported radial velocity of said target,
   (c) said radar processor is configured to use the Doppler shift of said reflected signal to calculate a measured radial velocity of said target,
   (d) a discrepancy between said reported radial velocity of said target and said measured radial velocity of said target indicates a system error comprising GPS spoofing, failure of the ADS-B system on said target, or deliberate misreporting by said target, and said radar processor is configured to note said discrepancy on said display as a second attention item, and
   (e) a receipt of said ADS-B messages from said target that is not confirmed by a reflected signal indicates that a false ADS-B signal is being broadcast and said radar processor is configured to note said false ADS-B signal on said display as a third attention item,
   whereby
   (k) said second ADS-B antenna is directional and said radar processor is configured to control said antenna controller which is configured to control the direction of said second ADS-B antenna,
   (l) said ADS-B processor is configured to control said ADS-B antenna multiplexer, and said ADS-B antenna multiplexer is configured to allow said ADS-B transmitter to use either said first ADS-B antenna or said second ADS-B antenna, and said ADS-B antenna multiplexer is also configured to allow said first ADS-B receiver to use either said first ADS-B antenna or said second ADS-B antenna, and said ADS-B antenna multiplexer is also configured to allow said second ADS-B receiver to use either said first ADS-B antenna or said second ADS-B antenna,
   (m) said ADS-B processor and said radar processor work together,
   (n) said ADS-B processor is configured to periodically cause said ADS-B transmitter to emit a transmitted signal through either said first ADS-B antenna or said second ADS-B antenna through said ADS-B antenna multiplexer,
   (o) said transmitted signal is reflected by a target producing a reflected signal,
   (p) said reflected signal is received by either or both said first ADS-B antenna or said second ADS-B antenna, and said ADS-B multiplexer is configured to select either said first ADS-B antenna or said second ADS-B antenna and send said reflected signal to said second ADS-B receiver,
   (q) said radar processor is configured to process said reflected signal from said second ADS-B receiver and said transmitted signal from said ADS-B transmitter to determine a range to said target,
   (r) said radar processor is configured to use the direction of said second antenna to determine a bearing to said target, and
   (s) said radar processor is configured to display said range and said bearing on said display.

3. The system of claim 1 wherein said radar processor is incorporated into said ADS-B processor.

4. The system of claim 3 wherein said second ADS-B antenna and said antenna controller comprise a mechanically aimed antenna.

5. The system of claim 3 wherein said second ADS-B antenna and said antenna controller comprise an active electronically scanned antenna array.

6. The system of claim 1 wherein said second ADS-B antenna and said antenna controller comprise a mechanically aimed antenna.

7. The system of claim 1 wherein said second ADS-B antenna and said antenna controller comprise an active electronically scanned antenna array.

8. A system for sensing aircraft and other objects comprising:
(a) an Automatic Dependent Surveillance-Broadcast (ADS-B) transmitter;
(b) a first ADS-B receiver;
(c) a first ADS-B antenna;
(d) a second ADS-B receiver;
(e) a second ADS-B antenna;
(f) an antenna controller;
(g) an ADS-B antenna multiplexer;
(h) an ADS-B processor;
(i) a radar processor;
(j) a display;

9. The system of claim 8 whereby
(a) if said range and said bearing to said target do not match the position of said target as reported by ADS-B messages from said target said radar processor is configured to note this on said display as a first attention item,
(b) said radar processor is configured to use the change in the positions of said target as reported by said ADS-B messages received from said target to calculate a reported radial velocity of said target,
(c) said radar processor is configured to use the Doppler shift of said reflected signal to calculate a measured radial velocity of said target,
(d) a discrepancy between said reported radial velocity of said target and said measured radial velocity of said target indicates a system error comprising GPS spoofing, failure of the ADS-B system on said target, or deliberate misreporting by said target, and said radar processor is configured to note said discrepancy on said display as a second attention item, and
(e) a receipt of said ADS-B messages from said target that is not confirmed by a reflected signal indicates that a false ADS-B signal is being broadcast and said radar processor is configured to note said false ADS-B signal on said display as a third attention item.

10. The system of claim 8 wherein said radar processor is incorporated into said ADS-B processor.

11. The system of claim 10 wherein said second ADS-B antenna and said antenna controller comprise a mechanically aimed antenna.

12. The system of claim 10 wherein said second ADS-B antenna and said antenna controller comprise an active electronically scanned antenna array.

13. The system of claim 8 wherein said second ADS-B antenna and said antenna controller comprise a mechanically aimed antenna.

14. The system of claim 8 wherein said second ADS-B antenna and said antenna controller comprise an active electronically scanned antenna array.

* * * * *